(12) United States Patent
Kim

(10) Patent No.: US 8,885,508 B2
(45) Date of Patent: Nov. 11, 2014

(54) METHOD AND APPARATUS FOR ACTIVATING CARRIERS IN MOBILE COMMUNICATION SYSTEM

(75) Inventor: Soeng-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 13/521,003

(22) PCT Filed: Jan. 19, 2011

(86) PCT No.: PCT/KR2011/000397
§ 371 (c)(1),
(2), (4) Date: Jul. 6, 2012

(87) PCT Pub. No.: WO2011/090319
PCT Pub. Date: Jul. 28, 2011

(65) Prior Publication Data
US 2013/0058233 A1    Mar. 7, 2013

(30) Foreign Application Priority Data

Jan. 19, 2010  (KR) .................. 10-2010-0004957
Mar. 17, 2010  (KR) .................. 10-2010-0023781
Apr. 12, 2010  (KR) .................. 10-2010-0033270
May 10, 2010  (KR) .................. 10-2010-0043689

(51) Int. Cl.
H04L 12/26    (2006.01)
H04W 72/04    (2009.01)
H04L 5/00    (2006.01)

(52) U.S. Cl.
CPC ............ *H04W 72/042* (2013.01); *H04L 5/001* (2013.01); *H04L 5/0098* (2013.01); *H04W 72/0453* (2013.01)

USPC ............ 370/252; 370/328; 370/329; 370/330

(58) Field of Classification Search
None
See application file for complete search history.

(56) References Cited

U.S. PATENT DOCUMENTS

| | | | |
|---|---|---|---|
| 2007/0070908 A1 | 3/2007 | Ghosh et al. | |
| 2009/0130985 A1* | 5/2009 | Lee et al. | 455/67.11 |
| 2010/0113023 A1* | 5/2010 | Huang et al. | 455/436 |
| 2011/0002281 A1* | 1/2011 | Terry et al. | 370/329 |
| 2011/0281601 A1* | 11/2011 | Ahn et al. | 455/500 |
| 2012/0099439 A1* | 4/2012 | Baldemair et al. | 370/241 |

FOREIGN PATENT DOCUMENTS

WO    2006/125149 A2    11/2006

OTHER PUBLICATIONS

R2-096752, "Activation and Deactivation of Component Carriers", 3GPP TSG-RAN WG2 #68, Oct. 9-13, 2009.
R2-096751, "DRX with Carrier Aggregation", 3GPP TSG-RAN WG2 #68, Oct. 9-13, 2009.

* cited by examiner

*Primary Examiner* — Kibrom T Hailu
*Assistant Examiner* — James P Duffy
(74) *Attorney, Agent, or Firm* — Jefferson IP Law, LLP

(57) ABSTRACT

A method for activating a carrier by a User Equipment (UE) in a mobile communication system supporting carrier aggregation is provided. The UE receives a Down-Link (DL) assignment from an Evolved Node B (ENB), and determines whether to activate a carrier based on the DL assignment. By doing so, the UE may perform carrier activation rapidly and efficiently.

10 Claims, 38 Drawing Sheets

METHOD AND APPARATUS FOR ACTIVATING CARRIERS IN MOBILE COMMUNICATION SYSTEM

PRIORITY

This application is a National Stage application under 35 U.S.C. §371 of an International application filed on Jan. 19, 2011 and assigned application No. PCT/KR2011/000397, and claims the benefit under 35 U.S.C. §365(b) of a Korean patent application filed in the Korean Industrial Property Office on Jan. 19, 2010 and assigned Serial No. 10-2010-0004957, a Korean patent application filed in the Korean Industrial Property Office on Mar. 17, 2010 and assigned Serial No. 10-2010-0023781, a Korean patent application filed in the Korean Industrial Property Office on Apr. 12, 2010 and assigned Serial No. 10-2010-0033270, and a Korean patent application filed in the Korean Industrial Property Office on May 10, 2010, and assigned Serial No. 10-2010-0043689, the entire disclosures of each of which are hereby incorporated by reference.

BACKGROUND OF THE INVENTION

1. Field of the Invention

The present invention relates to a mobile communication system. More particularly, the present invention relates to a method and apparatus for activating carriers by a terminal or a User Equipment (UE) for which a plurality of Down-Link (DL) carriers and Up-Link (UL) carriers are configured.

2. Description of the Related Art

Generally, mobile communication systems have been developed to provide communication services while enabling mobility of users. Due to the rapid development of technologies, the mobile communication systems now can provide not only voice communication services but also high-speed data communication services.

Standardization for Long Term Evolution (LTE) as one of the next-generation mobile communication systems is now underway in the 3rd Generation Partnership Project (3GPP). LTE, expected to be commercialized in about 2010, is technology for implementing high-speed packet-based communication having a data rate of as high as 100 Megabits per second (Mbps), which is higher than the currently available data rate, and its standardization has almost been completed. With the LTE standardization being in its final stage, an LTE-Advanced (LTE-A) communication system is under discussion, which further improves the data rate by combining several new technologies with the LTE communication system. A typical one of the technologies to be newly introduced may include Carrier Aggregation (CA). CA is a technology in which a User Equipment (UE) transmits/receives data using a plurality of carriers. More specifically, a UE performs high-speed communication by transmitting/receiving data through a specific cell having aggregated carriers, usually a cell belonging to the same Node B as that of the UE. CA includes a carrier configuration procedure of delivering information about carriers to be aggregated to a UE, and a carrier activation procedure of activating configured carriers at an appropriate time. The reason for using the duplex procedure—carrier configuration and carrier activation—is to minimize the battery consumption of a UE by activating only some of configured carriers and turning off transceivers associated with deactivated carriers when data transmission/reception is inactive. Preferably, therefore, the carrier activation procedure should be performed as quickly as possible.

SUMMARY OF THE INVENTION

Aspects of the present invention are to address at least the above-mentioned problems and/or disadvantages and to provide at least the advantages described below. Accordingly, an aspect of the present invention is to provide an apparatus and method for synchronizing use information between mobile communication terminals comprising short-range wireless communication units.

Exemplary embodiments of the present invention provide a method and apparatus for rapidly activating carriers in a mobile communication system.

Exemplary embodiments of the present invention provide a carrier activation method and apparatus for minimizing inefficiency caused by transmitting carrier activation commands with a Down-Link (DL) assignment in a mobile communication system.

In accordance with an aspect of the present invention, a method for activating a carrier by a User Equipment (UE) in a mobile communication system supporting carrier aggregation is provided. The method includes receiving a DL assignment from an Evolved Node B (ENB), and determining whether to activate a carrier based on the DL assignment.

In accordance with another aspect of the present invention, a UE in a mobile communication system supporting carrier aggregation is provided. The UE includes a receiver for receiving a DL assignment from an ENB, and a controller for determining whether to activate a carrier based on the DL assignment.

In accordance with another aspect of the present invention, a method for activating a carrier by a UE in a mobile communication system supporting carrier aggregation is provided. The method includes receiving a receiving a DL assignment from an ENB over a specific carrier, and temporarily activating at least one carrier having not been activated, based on the DL assignment.

In accordance with another aspect of the present invention, a UE in a mobile communication system supporting carrier aggregation is provided. The UE includes a receiver for receiving a DL assignment from an ENB, and a controller for temporarily activating at least one carrier having not been activated, if the DL assignment is received over a specific carrier.

In accordance with another aspect of the present invention, a method for activating a carrier by a UE in a mobile communication system supporting carrier aggregation is provided. The method includes receiving a DL assignment from an ENB over a specific carrier, determining whether the DL assignment indicates a carrier activation command, and activating at least one carrier corresponding to the carrier activation command, if the DL assignment indicates the carrier activation command.

In accordance with another aspect of the present invention, a UE in a mobile communication system supporting carrier aggregation is provided. The UE includes a receiver for receiving a DL assignment from an ENB, and a controller for determining whether the DL assignment indicates a carrier activation command, and activating at least one carrier corresponding to the carrier activation command if the DL assignment indicates the carrier activation command.

In accordance with another aspect of the present invention, a method for measuring a carrier by a UE in a mobile communication system supporting carrier aggregation is provided. The method includes receiving a parameter for measurement of a carrier in a deactivated state, from an ENB, in performing measurement on a carrier in an activated state, determining a measurement interval and a measurement period taking a Discontinuous Reception (DRX) operation into account and measuring the carrier at the determined measurement interval for the determined measurement period, and in performing measurement on the carrier in the deactivated state, determining a measurement interval and a measurement period using a parameter related to at least one of a measurement interval and a measurement period indicated by the ENB, and measuring the carrier at the determined measurement interval for the determined measurement period.

In accordance with another aspect of the present invention, a User Equipment (UE) in a mobile communication system supporting carrier aggregation is provided. The UE includes a receiver for receiving a parameter for measurement of a carrier in a deactivated state, from an ENB, and a controller for, in performing measurement on a carrier in an activated state, determining a measurement interval and a measurement period taking a DRX operation into account and measuring the carrier at the determined measurement interval for the determined measurement period, and in performing measurement on the carrier in the deactivated state, determining a measurement interval and a measurement period using a parameter related to at least one of a measurement interval and a measurement period indicated by the ENB, and measuring the carrier at the determined measurement interval for the determined measurement period.

In accordance with another aspect of the present invention, a method for activating a carrier by a UE in a mobile communication system supporting carrier aggregation is provided. The method includes receiving a carrier activation command from an ENB, determining a time at which an operation required for carrier activation is to be performed, and performing the operation required for carrier activation at the determined time.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention will now be described in detail with reference to the accompanying drawings. The present invention may, however, be embodied in many different forms and should not be construed as being limited to the exemplary embodiments set forth herein.

In the following detailed description of exemplary embodiments of the present invention, $3^{rd}$ Generation Partnership Project (3GPP) Evolved Universal Mobile Telecommunication System (UMTS) Terrestrial Radio Access (EUTRA) (or Long Term Evolution (LTE)), or Advanced E-UTRA (or LTE-A) will be mainly taken into account. However, it will be understood by those of ordinary skill in the art that the gist of the present invention may be applied to any other communication systems having similar technical backgrounds and channel formats with a slight modification without departing from the spirit and scope of the invention.

Exemplary embodiments of the present invention relates to a method and apparatus for efficiently activating carriers.

Figure 1:
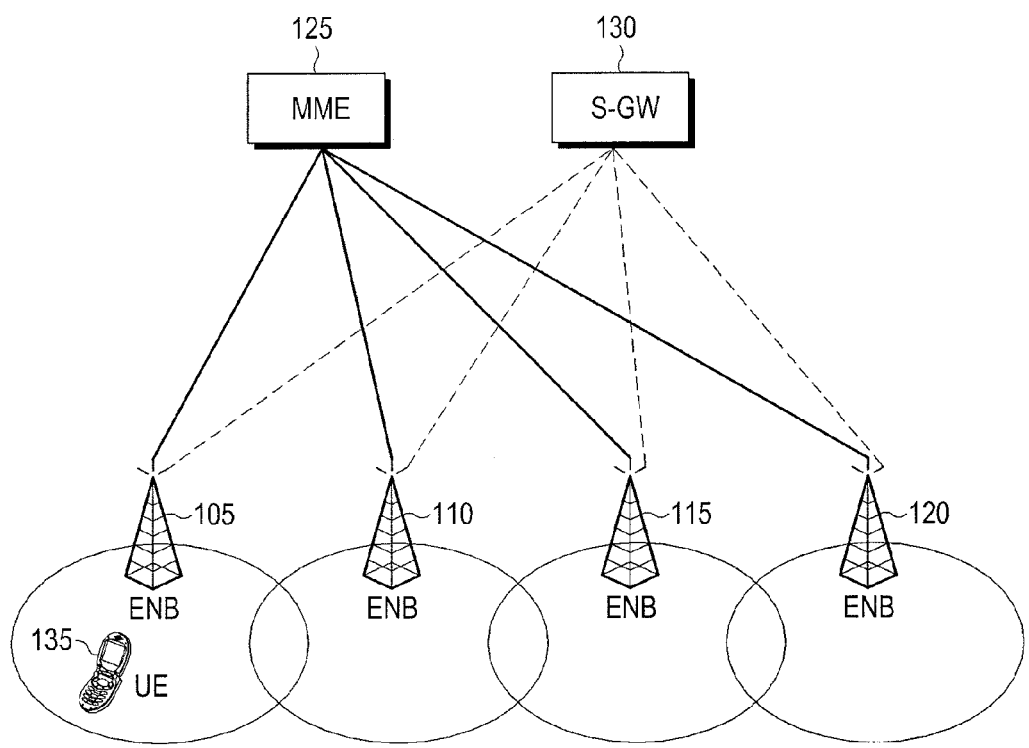
FIG. 1 is a diagram illustrating a configuration of a Long Term Evolution (LTE) mobile communication system according to an exemplary embodiment of the present invention.

Prior to a detailed description of exemplary embodiments of the present invention, an LTE mobile communication system will be described in more detail with reference to FIGS. 1, 2 and 3. FIG. 1 illustrates a configuration of an LTE mobile communication system.

Referring to FIG. 1, a wireless access network of an LTE mobile communication system includes Evolved Node Bs (ENBs) 105, 110, 115, and 120, a Mobility Management Entity (MME) 125, and a Serving-Gateway (S-GW) 130. A User Equipment (UE) 135 accesses external networks via the ENBs 105~120, and the S-GW 130.

The ENBs 105~120 correspond to the legacy Node Bs of a UMTS system. The ENBs 105~120 are connected to the UE 135 by wireless channels. Since all user traffics including real-time services such as Voice over Internet Protocol (IP) (VoIP) are serviced through shared channels, a device for performing scheduling by collecting state information of UEs is required, and this scheduling operation is covered by the ENBs 105~120. Commonly, one ENB controls a plurality of cells. To implement a data rate of a maximum of 100 Megabits per second (Mbps) per cell, LTE uses Orthogonal Frequency Division Multiplexing (OFDM) as wireless access technology in a bandwidth of a maximum of 20 MegaHertz (MHz). In addition, LTE employs Adaptive Modulation & Coding (AMC) that adaptively determines a modulation scheme and a channel coding rate depending on the channel condition of the UE 135. The S-GW 130, a device for providing data bearers, generates and removes data bearers under control of the MME 125. The MME 125, a device responsible for various control functions, is connected to a plurality of ENBs.

Figure 2:
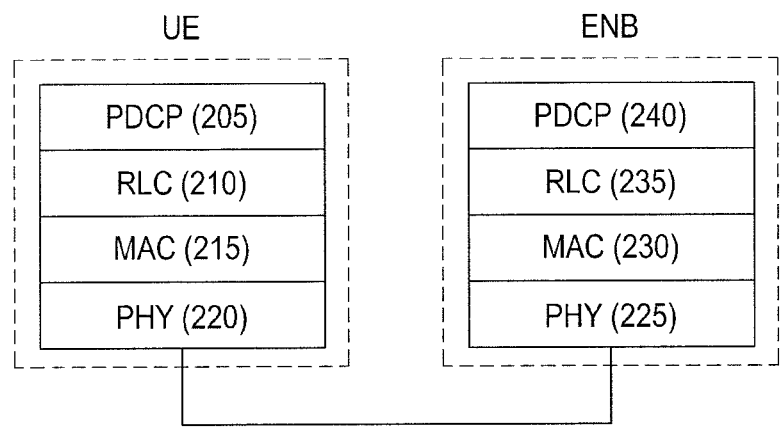
FIG. 2 is a diagram illustrating protocol architecture of an LTE mobile communication system according to an exemplary embodiment of the present invention.

FIG. 2 illustrates protocol architecture of an LTE mobile communication system according to an exemplary embodiment of the present invention. A radio protocol will be described in brief with reference to FIG. 2.

Referring to FIG. 2, a radio protocol of the LTE system includes Packet Data Convergence Protocols (PDCPs) 205 and 240, Radio Link Controls (RLCs) 210 and 235, and Medium Access Controls (MACs) 215 and 230. The PDCPs 205 and 240 take charge of IP header compression/decompression, and the RLCs 210 and 235 reconstruct PDCP Protocol Data Units (PDUs) in an appropriate size, and perform an Automatic Repeat reQuest (ARQ) operation. The MACs 215 and 230 are connected to several RLC-layer devices constructed in one UE, and perform an operation of multiplexing RLC PDUs to a MAC PDU and demultiplexing RLC PDUs from a MAC PDU. Physical (PHY) layers 220 and 225 perform an operation of channel-coding, modulating, and scrambling upper layer data into an OFDM symbol and transmitting the OFDM symbol on a wireless channel, or an operation of descrambling, demodulating, and channel-decoding an OFDM symbol received over a wireless channel and delivering the decoded OFDM symbol to their respective upper layers. The transmitted data being input to a protocol entity is referred to as a Service Data Unit (SDU), while the transmitted data being output from the protocol entity is referred to as a Protocol Data Unit (PDU).

Figure 3:
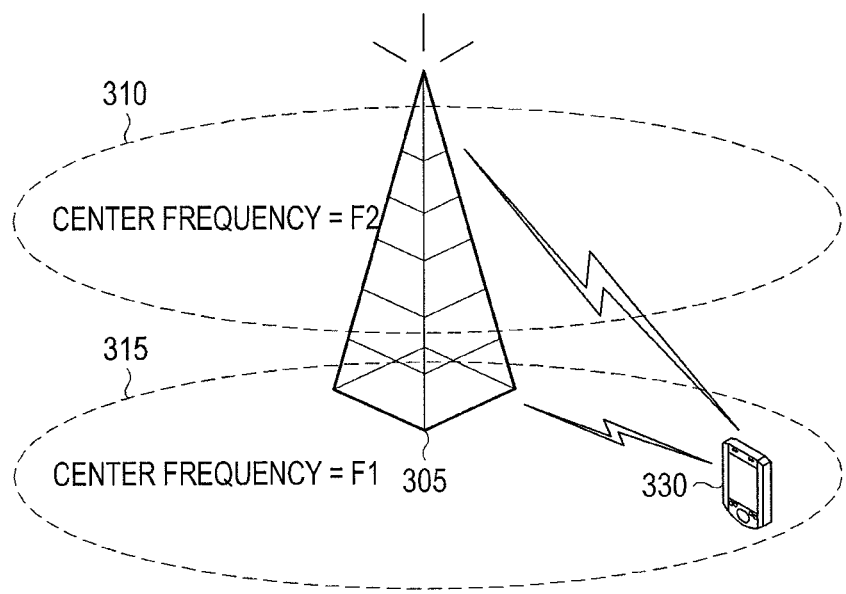
FIG. 3 is a diagram illustrating Carrier Aggregation (CA) in an LTE mobile communication system according to an exemplary embodiment of the present invention.

FIG. 3 illustrates Carrier Aggregation (CA) in an LTE mobile communication system according to an exemplary embodiment of the present invention. CA will be described in brief with reference to FIG. 3.

Generally, in one ENB, a plurality of carriers are transmitted and received over several frequency bands. For example, when a carrier 315 with a center frequency=f1 and a carrier 310 with a center frequency=f2 are transmitted in an ENB 305, one UE 330 transmits/receives data using one of the two carriers. However, a UE 330 having a CA capability (hereinafter referred to as a 'CA UE') may transmit/receive data using several carriers at the same time. An ENB may increase a data rate of a CA UE by allocating more carriers to the CA UE depending on the circumstances. Supposing that one Down-Link (DL) carrier and one Up-Link (UL) carrier transmitted/received in one ENB constitute one cell in the traditional sense, the term 'CA' may be considered that a UE transmits/receives data through several cells at the same time. The maximum data rate by CA increases with the number of aggregated carriers. In the following description, a UE's receiving of data through an arbitrary DL carrier or transmitting of data through an arbitrary UL carrier may be equivalent to transmitting/receiving data using a control channel and a data channel provided by a cell corresponding to a center frequency and a frequency band characterizing the carrier.

Figure 4:
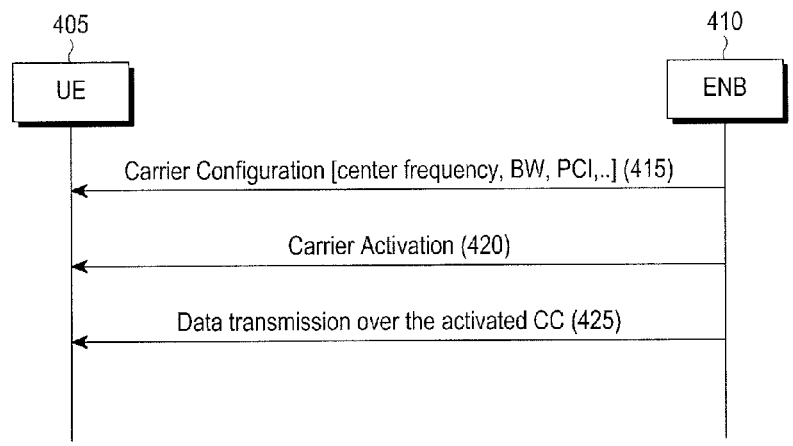
FIG. 4 is a flow diagram illustrating a carrier configuration and carrier activation process in an LTE mobile communication system according to an exemplary embodiment of the present invention.

FIG. 4 illustrates a carrier configuration and carrier activation process in an LTE mobile communication system according to an exemplary embodiment of the present invention.

Referring now to FIG. 4, CA is dualized into a process of delivering information about carriers to a UE, and a process of activating carriers. For example, in step 415, an ENB 410 provides information about carriers to be aggregated to an arbitrary CA UE 405. The information includes a center frequency, a bandwidth (BW), a Physical Cell ID (PCI), etc. of a carrier. A UE memorizes the received information, and if needed, performs an operation of acquiring DL synchronization of a cell associated with the carrier. Acquiring DL synchronization of an arbitrary cell means acquiring frame synchronization by receiving a synchronization channel of the cell. If the amount of data to be transmitted to the UE 405 increases, the ENB 410 activates a carrier configured for the UE 405 in step 420, and transmits data to the UE 405 even over the activated carrier in step 425, thereby increasing the data rate. In the following description, aggregating carriers may be equivalent to aggregating cells specified to the carriers. Delivering information about carriers and cells to be aggregated to a UE is expressed as configuring the carriers. In addition, a carrier aggregated for a UE is called a Component Carrier (CC). For convenience of description, the terms 'carrier', 'cell' and 'CC' are used herein with the same meaning.

A maximum of five CCs may be aggregated for one UE. For efficient communication, it is preferable to configure as many carriers as possible for one UE, so as to rapidly activate the carriers for data transmission/reception in case of an increase in the amount of traffic, and deactivate the carriers in case of a decrease in the amount of traffic. In exemplary embodiments of the present invention, carrier activation is performed as quickly as possible by making a carrier activation command using a physical layer signal. To be more specific, a carrier activation command is transmitted over a DL Physical Downlink Control Channel (PDCCH). In addition, a carrier activation command is delivered using a DL assignment containing DL scheduling information.

Figure 5:
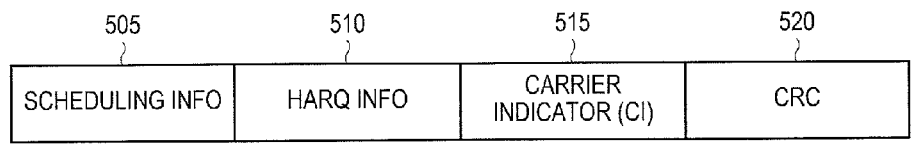
FIG. 5 is a diagram illustrating a structure of a Down-Link (DL) assignment in an LTE mobile communication system according to an exemplary embodiment of the present invention.

FIG. 5 illustrates a structure of a DL assignment in an LTE mobile communication system according to an exemplary embodiment of the present invention.

A DL assignment includes scheduling information 505, Hybrid ARQ (HARQ) information 510, a Carrier Indicator (CI) 515, and a Cyclic Redundancy Check (CRC) code 520. The scheduling information 505 includes information about resources allocated to a DL Physical Downlink Shared Channel (PDSCH) over which DL data is to be transmitted, and information about a Modulation Coding Scheme (MCS) to be applied for DL data transmission.

The HARQ information 510 includes an identifier of an HARQ processor to be used for DL data transmission. The above information is information that a UE should know to receive DL data over a PDSCH, and for convenience of description, the above information will be referred to as PDSCH-related information. The CRC 520 is used to determine existence/nonexistence of an error in DL assignment information, and includes a result value of a CRC operation on information including an identifier of a UE, called a Cell-Radio Network Temporary Identity (C-RNTI). Thus, even though an arbitrary UE receives a DL assignment of another UE, a CRC fail occurs, and a CRC OK occurs only for the DL assignment transmitted to the UE itself. So, the CRC code value may also allow a UE to receive only the DL assignment transmitted to the UE itself.

The carrier indicator 515 is 3-bit information indicating over which carrier the DL data is to be transmitted. When carriers are aggregated for the UE 405, the ENB 410 allocates a 3-bit identifier to each carrier, and the carrier indicator 515 indicates which carrier the DL assignment schedules. A first exemplary embodiment of the present invention provides a method of instructing activation of a DL carrier using the carrier indicator.

First Exemplary Embodiment

In the first exemplary embodiment of the present invention, an ENB instructs a UE to activate a specific carrier, using a carrier indicator field of a DL assignment. In the first exemplary embodiment of the present invention, the DL assignment may be either a common DL assignment or a carrier activation command. If a carrier indicated in the carrier indicator 515 of the DL assignment is a carrier having already been activated, the DL assignment is a common DL assignment. That is, the UE 405 receives DL data from the carrier indicated in the carrier indicator 515 of the DL assignment according to the scheduling information 505 and the HARQ information 510 of the DL assignment. If a carrier indicated in the carrier indicator 515 of the DL assignment is a carrier having not been activated yet, the DL assignment is a carrier activation command. The UE 405 activates the carrier indicated in the carrier indicator 515 of the carrier activation command.

Figure 6:
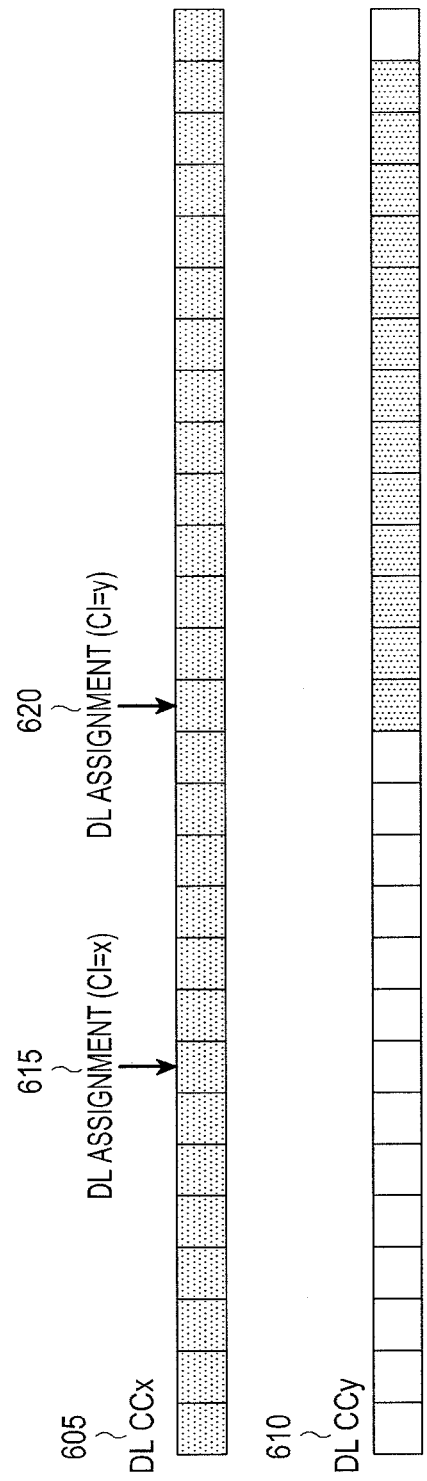
FIG. 6 is a diagram illustrating an operation of activating DL carriers using a carrier indicator according to an exemplary embodiment of the present invention.

FIG. 6 illustrates an operation of activating DL carriers using a carrier indicator according to an exemplary embodiment of the present invention.

Activating an arbitrary carrier means turning on a receiver for the carrier and starting receiving a signal from the carrier. In other words, a UE 405 receives PDCCH and PDSCH only from the activated carriers among the configured carriers, and receives no PDCCH and PDSCH from the deactivated carriers. For example, two DL carriers—a DL CCx 605 and a DL CCy 610—are configured for one UE 405, and the DL CCx 605 is activated. In FIG. 6, a square represents a subframe, a gray square represents an activated carrier in a subframe, and a white square represents a deactivated carrier in a subframe. The UE 405 continuously receives a PDCCH of an activated carrier, e.g., the DL CCx. Upon receiving a DL assignment with a carrier indicator 515, in which a carrier having already been activated, e.g., DL CCx, is included, over the DL CCx at an arbitrary time 615, the UE 405 receives a PDSCH over the DL CCx according to scheduling information 505 and HARQ information 510 in the DL assignment, determining that the received DL assignment is a common DL assignment. Thereafter, if a new DL assignment is received over the DL CCx at an arbitrary time 620 and a carrier indicator 515 of the received DL assignment indicates a carrier having not been activated yet, e.g., DL CCy, then the UE 405 activates the DL CCy indicated by the carrier indicator 515, determining that the received DL assignment is a carrier activation command.

As described above, the UE 405 does not receive a signal of a deactivated DL carrier. However, if a deactivated DL carrier is activated using a carrier indicator of a DL assignment as proposed in the present invention, the UE 405 does not receive a signal of a DL carrier to be activated until it completes analysis of the carrier activation command, causing a waste of PDSCH-related information included in the carrier activation command. To be more specific, in order to fully receive a PDSCH of an arbitrary carrier, the UE 405 should receive the carrier beginning from a start point of a subframe. Despite normal reception of a carrier activation command, since the reception of the carrier activation command is completed after a lapse of a significant part of a subframe, the UE 405 cannot receive a PDSCH from a newly activated carrier in the subframe. To address these and other problems, in the present exemplary embodiment, if an arbitrary DL assignment is a carrier activation command, PDSCH-related information included therein is defined as a specific carrier among the carriers having already been activated, rather than a carrier indicated by the carrier indicator 515. In other words, if a carrier indicator 515 of a DL assignment indicates a carrier having already been activated, PDSCH-related information in the DL assignment is used to receive a PDSCH over the indicated carrier, and if a carrier indicator 515 of a DL assignment indicates a deactivated carrier, the UE 405 activates the deactivated carrier and receives a PDSCH over a specific carrier other than the carrier indicated by the carrier indicator 515.

Figure 7:
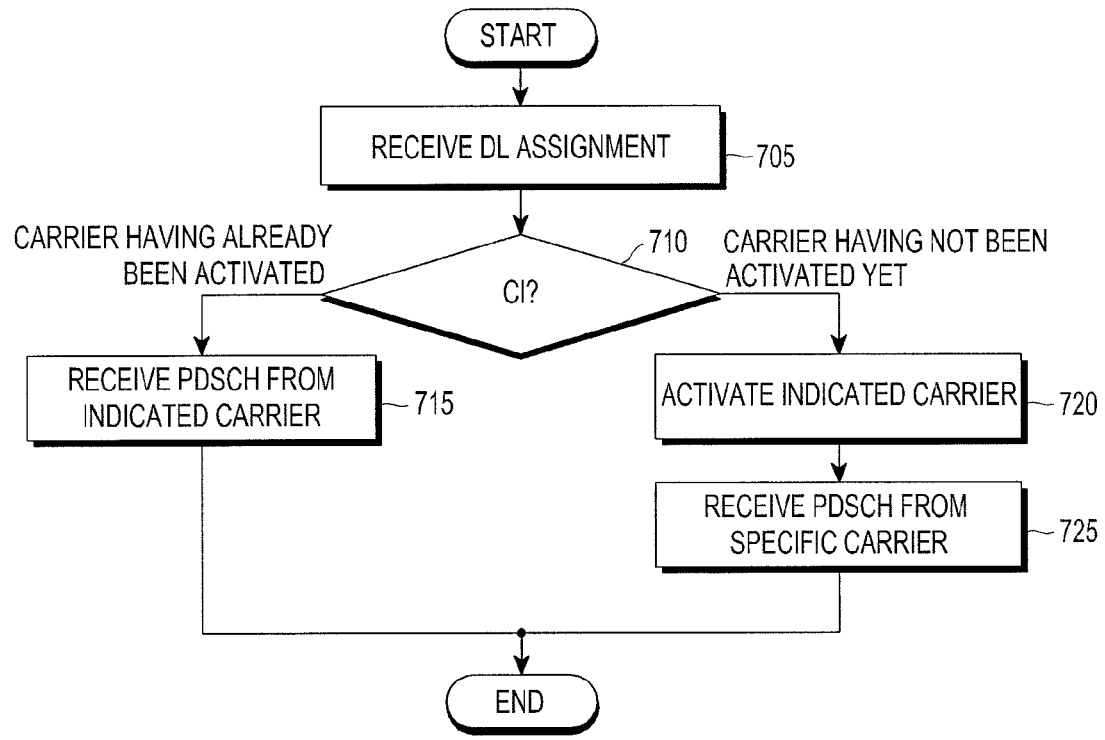
FIG. 7 is a flowchart illustrating an operation of a User Equipment (UE) according to a first exemplary embodiment of the present invention.

FIG. 7 illustrates an operation of a UE according to the first exemplary embodiment of the present invention.

Upon receiving a DL assignment in step 705, a UE 405 checks a carrier indicator 515 of the received DL assignment in step 710. If a carrier indicated in the carrier indicator 515 is a carrier having already been activated, the UE 405 proceeds to step 715, and if the indicated carrier is a carrier having not been activated yet, the UE 405 proceeds to step 720. In step 715, the UE 405 receives a PDSCH of the carrier indicated in the carrier indicator 515 using the PDSCH-related information of the DL assignment. In step 720, the UE 405 activates the carrier indicated in the carrier indicator 515. In step 725, the UE 405 receives a PDSCH from a specific carrier using the PDSCH-related information of the received DL assignment. The specific carrier may be a carrier predetermined by an implicit rule. For example, a carrier always maintaining its activated state, i.e., an anchor carrier to which the UE 405 is anchoring, can be used for the above purpose. That is, upon receiving a DL assignment indicating a carrier having not been activated yet, the UE 405 receives a PDSCH of an anchor carrier using the PDSCH-related information of the DL assignment. Also, the ENB 410 may explicitly inform the UE 405 of which carrier it will use for the above purpose, in a call setup process or a CA process. Otherwise, the carrier may be a carrier over which the DL assignment is received. Upon receiving a DL assignment indicating a carrier having not been activated yet, the UE 405 receives a PDSCH of the pre-designated carrier, or a carrier over which the DL assignment was received, using PDSCH-related information of the DL assignment.

Second Exemplary Embodiment

A second exemplary embodiment of the present invention provides a method of transmitting a carrier activation command using a Downlink Control Information (DCI) format 1C.

Figure 8:
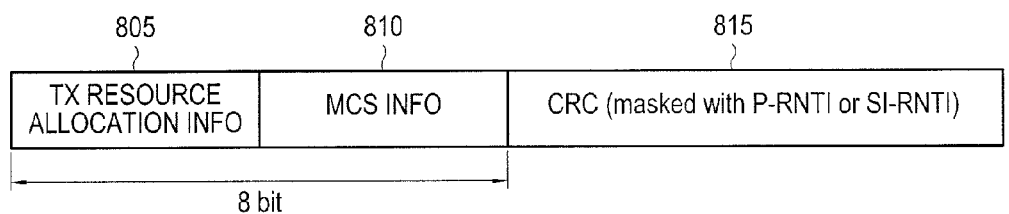
FIG. 8 is a diagram illustrating a structure of a Downlink Control Information (DCI) Format 1C according to an exemplary embodiment of the present invention.

FIG. 8 illustrates a structure of a DCI format 1C according to an exemplary embodiment of the present invention.

A DCI format 1C is a small-sized DL assignment format defined to be used in the case where HARQ information such as paging message and system information is not applied and only limited resources are allocated. A size of the DCI format 1C is variable according to the system bandwidth, and in the minimum system bandwidth, the DCI format 1C excluding a CRC code has eight bits. The DCI format 1C includes transmission resource allocation information 805, MCS information 810, and CRC 815. The CRC field 815 includes a CRC operation result masked with an RNTI associated with a plurality of unspecified UEs, such as a Paging (P)-RNTI or a System Information (SI)-RNTI. The P-RNTI or SI-RNTI is an RNTI defined for a paging message or system information, and is defined per cell.

Figure 9:
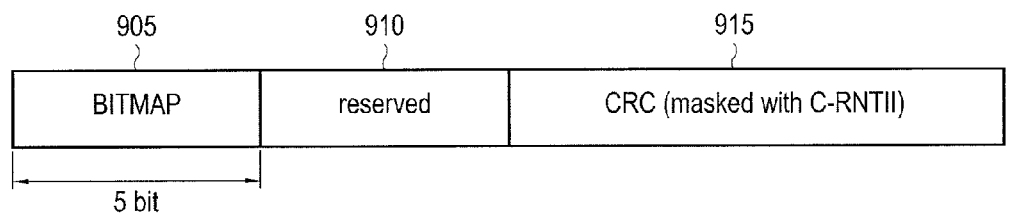
FIG. 9 is a diagram illustrating a structure of a carrier activation command based on a DCI Format 1C according to an exemplary embodiment of the present invention.

FIG. 9 illustrates a structure of a carrier activation command based on a DCI format 1C according to an exemplary embodiment of the present invention.

In the second exemplary embodiment of the present invention, a carrier activation command is transmitted/received using a DCI format 1C. To distinguish the carrier activation command from the common DL assignment transmitted over the DCI format 1C, a CRC field 915 of the carrier activation command includes a CRC operation result masked with a C-RNTI or a UE's unique identifier. The carrier activation command includes a 5-bit bitmap 905, and the bits of the bitmap 905 are mapped to carriers configured for the UE 405 on a one-to-one basis. The mapping relationship is set by a specific rule or an explicit indication in the CA process. If a bit of the bitmap 905 is set to '1', it means that a carrier mapped to the bit is activated, and if a bit of the bitmap 905 is set to '0', it means that a carrier mapped to the bit is deactivated. Bits 910 are reserved for future use and will not be further described herein.

Figure 10:
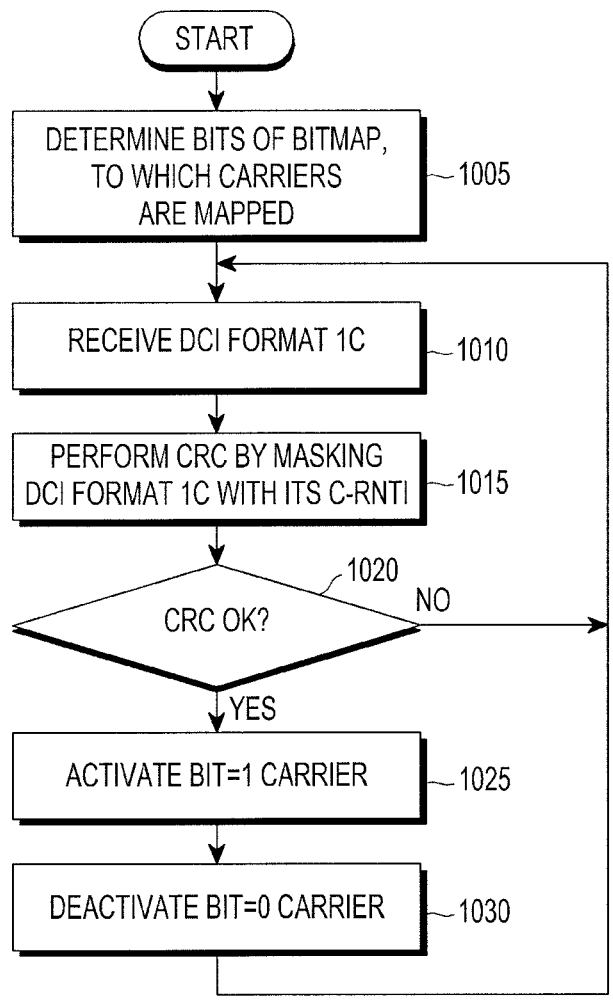
FIG. 10 is a flowchart illustrating an operation of a UE according to a second exemplary embodiment of the present invention.

FIG. 10 illustrates an operation of a UE according to the second exemplary embodiment of the present invention.

In step 1005, a UE 405 receives a CA message from an ENB 410. Based on information in the received CA message, the UE 405 configures carriers to be aggregated, and determines to which bits of a bitmap the carriers will be mapped. After configuring carriers depending on the CA message, the UE 405 starts receiving a DCI format 1C over a PDCCH in step 1010. In step 1015, the UE 405 performs a CRC operation by masking the DCI format 1C received from the ENB 410 with its C-RNTI. In step 1020, the UE 405 checks occurrence/non-occurrence of an error referring to the CRC operation result. In the absence of an error, since the received DCI format 1C means a carrier activation command, the UE 405 proceeds to step 1025. However, in case of a CRC error, the UE 405 repeats a process of receiving a DCI format 1C in the next subframe, performing a CRC operation, and determining reception/non-reception of a carrier activation command. In step 1025, the UE 405 analyzes bitmap information of the received carrier activation command and activates a carrier, a bit mapped to which is set to '1' In step 1030, the UE 405 deactivates a carrier, a bit mapped to which is set to '0'.

Third Exemplary Embodiment

Figure 11:
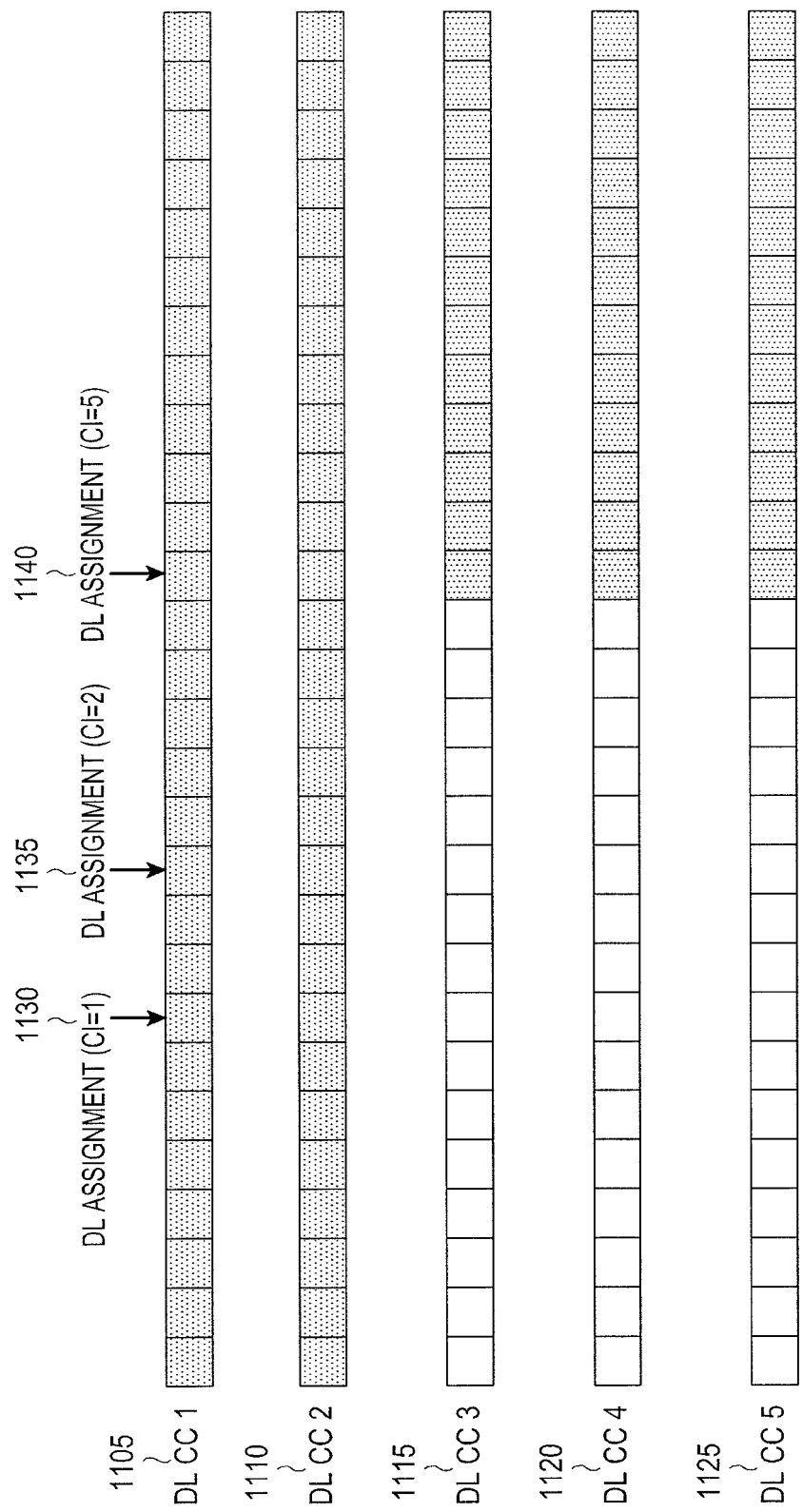
FIG. 11 is a diagram illustrating an example of an operation according to a third exemplary embodiment of the present invention.

FIG. 11 illustrates an example of an operation according to a third exemplary embodiment of the present invention.

CA undergoes a procedure consisting of two steps, carrier configuration and carrier activation, in order to minimize power consumption. Since carriers having similar bands are generally driven by one transceiver, there is no significant difference in power consumption, even though only some carriers are activated and the other carriers are deactivated. The third exemplary embodiment of the present invention provides a method of grouping carriers having similar frequency bands, and activating/deactivating the carriers on a group-by-group basis.

When transmitting a control message for carrier configuration to the UE 405, the ENB 410 indicates carriers belonging to the same group as well. For example, five carriers of DL CC 1 1105, DL CC 2 1110, DL CC 3 1115, DL CC 4 1120, and DL CC 5 1125 are configured for an arbitrary UE 405. Assume that among the carriers, the DL CC 1 1105 and the DL CC 2 1110 belong to a similar frequency band, and the other DL CCs belong to another similar frequency band. An ENB 410 configures the DL CC 1 1105 and the DL CC 2 1110 as one group, and configures the DL CC 3 1115, the DL CC 4 1120, and the DL CC 5 1125 as another group. While configuring the carriers, the ENB 410 notifies the UE 405 of the group information as well. For example, if the DL CC 1 1105 is an anchor carrier, the DL CC 1 1105 always maintains its activated state. Also, even the DL CC 2 1110 belonging to the same group as that of the DL CC 1 1105 always maintains its activated state. The UE 405 receives a DL assignment over the activated carrier. If a carrier indicator 515 of the received DL assignment indicates a carrier belonging to a group having already been activated, for example, if the carrier indicator 515 indicates a carrier #1 1130 or a carrier #2 1135, the UE 405 receives a PDSCH from the indicated carrier. If the received carrier indicator 515 indicates a carrier belonging to a group having not been activated yet, for example, if the carrier indicator 515 indicates a carrier #5 1140, the UE 405 activates all carriers belonging to the same group as that of the indicated carrier, i.e., the DL CC 3 1115, the DL CC 4 1120, and the DL CC 5 1125.

Figure 12:
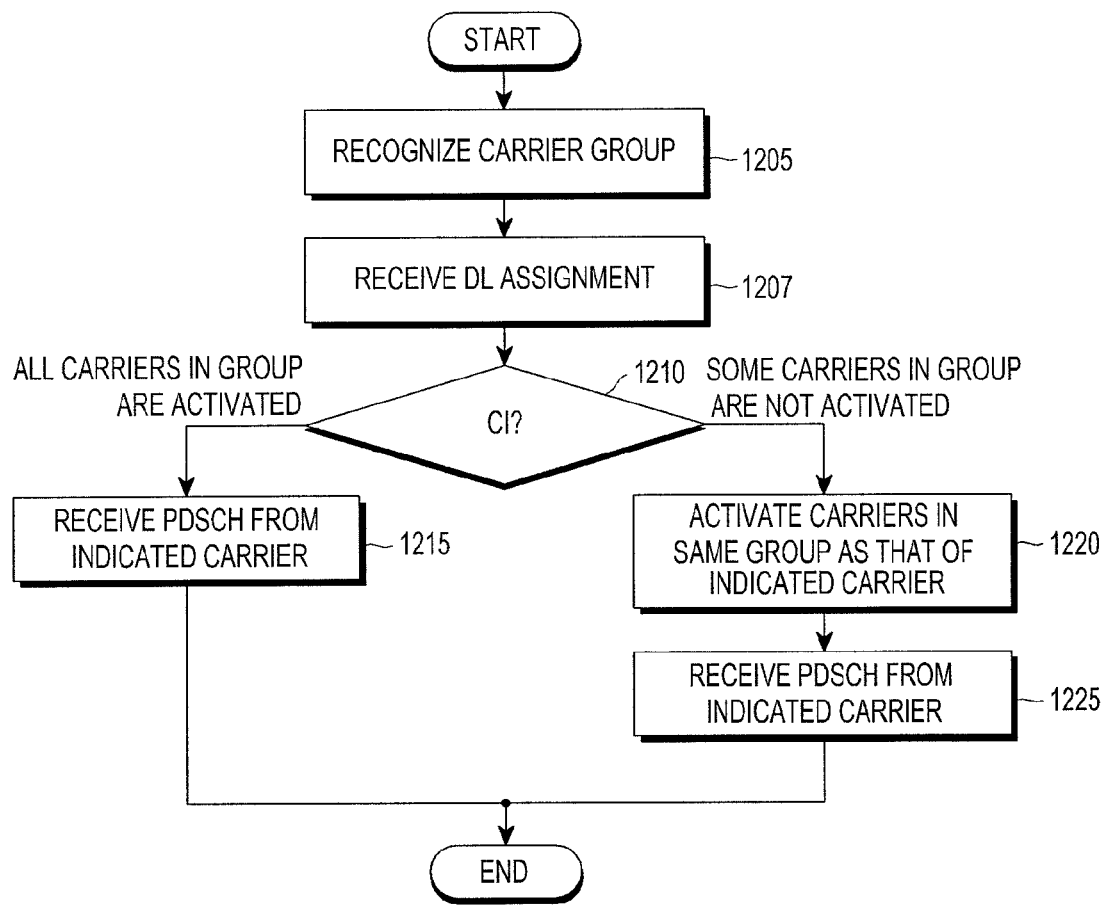
FIG. 12 is a flowchart illustrating an operation of a UE according to the third exemplary embodiment of the present invention.

FIG. 12 illustrates an operation of a UE according to the third exemplary embodiment of the present invention.

Referring now to FIG. 12, in step 1205, a UE 405 recognizes a group of configured carriers. For example, the UE 405 may receive a CA message and recognize a group to which configured carriers belong, based on the information indicating to which group specific carriers included in the received CA message belong.

Upon receiving a DL assignment in step 1207, the UE 405 checks a carrier indicator in the DL assignment in step 1210. If all carriers in the same group as that of indicated carriers have already been activated, the UE 405 proceeds to step 1215. On the other hand, if there is at least one deactivated carrier among the carriers in the same group as that of the indicated carrier, the UE 405 proceeds to step 1220.

In step 1215, the UE 405 receives a PDSCH from the carrier indicated in the DL assignment. On the other hand, in step 1220, in step 1220, the UE 405 activates a carrier(s) having not been activated yet among the carriers in the same group as that of the carrier indicated in the DL assignment. Thereafter, in step 1225, the UE 405 receives a PDSCH from the carrier indicated in the DL assignment. The carrier, from which the PDSCH is received, may be a carrier from which a predetermined specific carrier or DL assignment is received, as in the first exemplary embodiment.

Fourth Exemplary Embodiment

Figure 13:
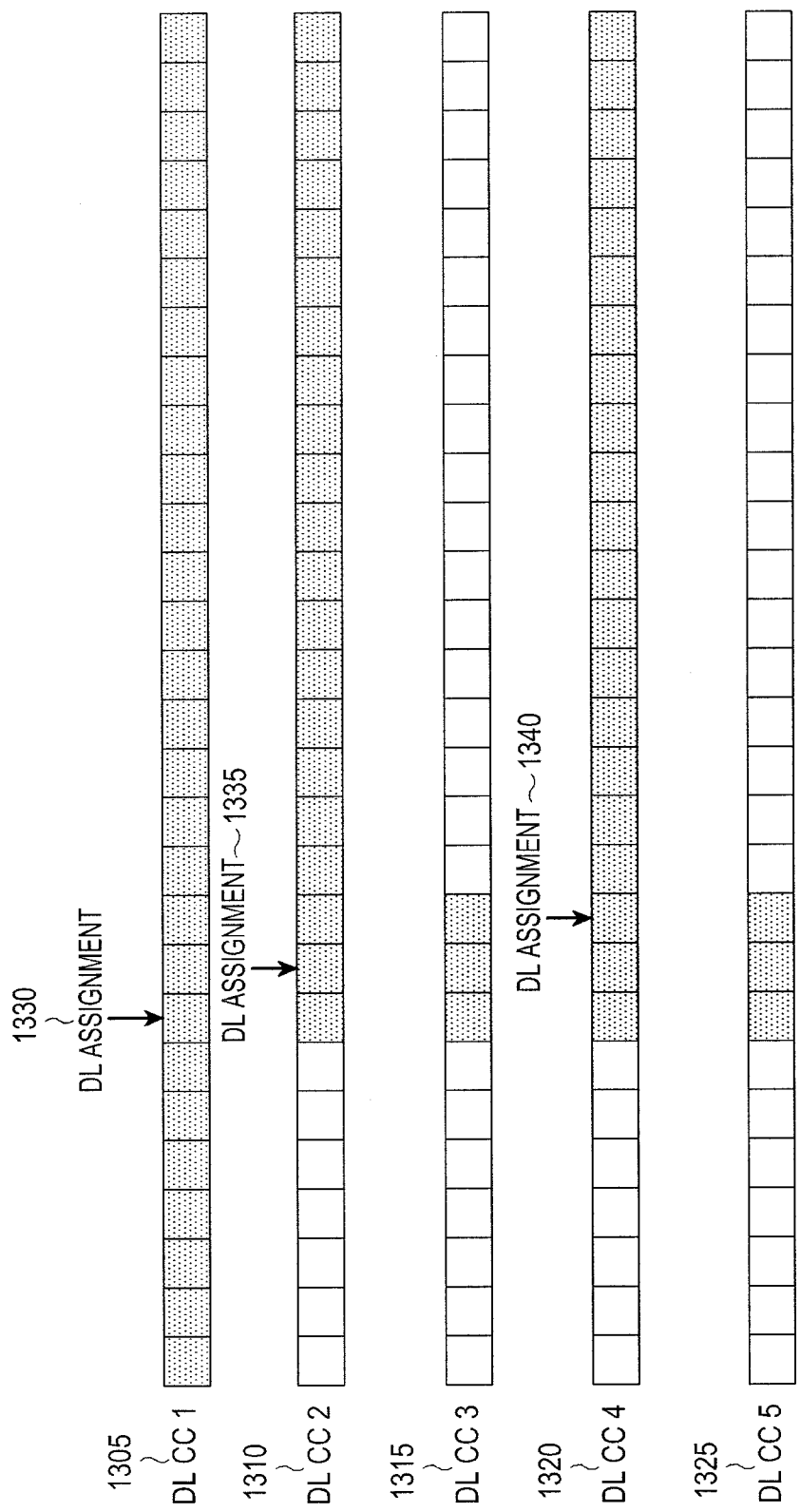
FIG. 13 is a diagram illustrating an example of an operation according to a fourth exemplary embodiment of the present invention.

FIG. 13 illustrates an example of an operation according to a fourth exemplary embodiment of the present invention.

Referring now to FIG. 13, a carrier indicator 515 may be either configured or not configured for every individual UE. Hence, a method of activating carriers using a carrier indicator 515 cannot be used for a UE 405 for which the carrier indicator 515 is not configured. The fourth exemplary embodiment of the present invention provides a method of temporarily activating all carriers for a specific period upon occurrence of a specific event, instead of using the carrier indicator 515, and then determining whether to activate the carriers depending on the reception/non-reception of a DL assignment while in the temporarily activated state. The specific event may be, for example, an event in which a specific DL scheduling assignment is received from an anchor carrier. For instance, a five carriers of a DL CC 1 1305, a DL CC 2 1310, a DL CC 3 1315, a DL CC 4 1320, and a DL CC 5 1325 are configured for an arbitrary UE. If the DL CC 1 1305 is an anchor carrier, this carrier always maintains its activated state. Upon receiving a DL assignment 1330 over the DL CC 1 1305 at an arbitrary time, a UE 405 temporarily activates all of configured DL carriers. As to a temporary activation period, an ENB 410 determines the temporary activation period and notifies it to the UE 405 through a call setup process. It is assumed in FIG. 13 that the temporary activation period is a period of three subframes. The UE 405 starts receiving PDCCHs of the temporarily activated DL carriers. Upon receiving a DL assignment 1335 over the DL CC 2 1310 at an arbitrary time that the temporarily activated state has not been ended, the UE 405 activates the DL CC 2 1310 and then maintains the activated state unless the ENB 410 explicitly instructs deactivation, or unless another specific timer expires. Upon receiving a DL assignment 1340 over the DL CC 4 1320 at an arbitrary time when the temporarily activated state has not been ended, the UE 405 activates the DL CC 4 1320. Upon expiry of the temporary activation period, the UE 405 deactivates the remaining carriers, i.e., the DL CC 3 1315 and the DL CC 5 1325, which have not been actually activated until the temporary activation period expires.

Figure 14:
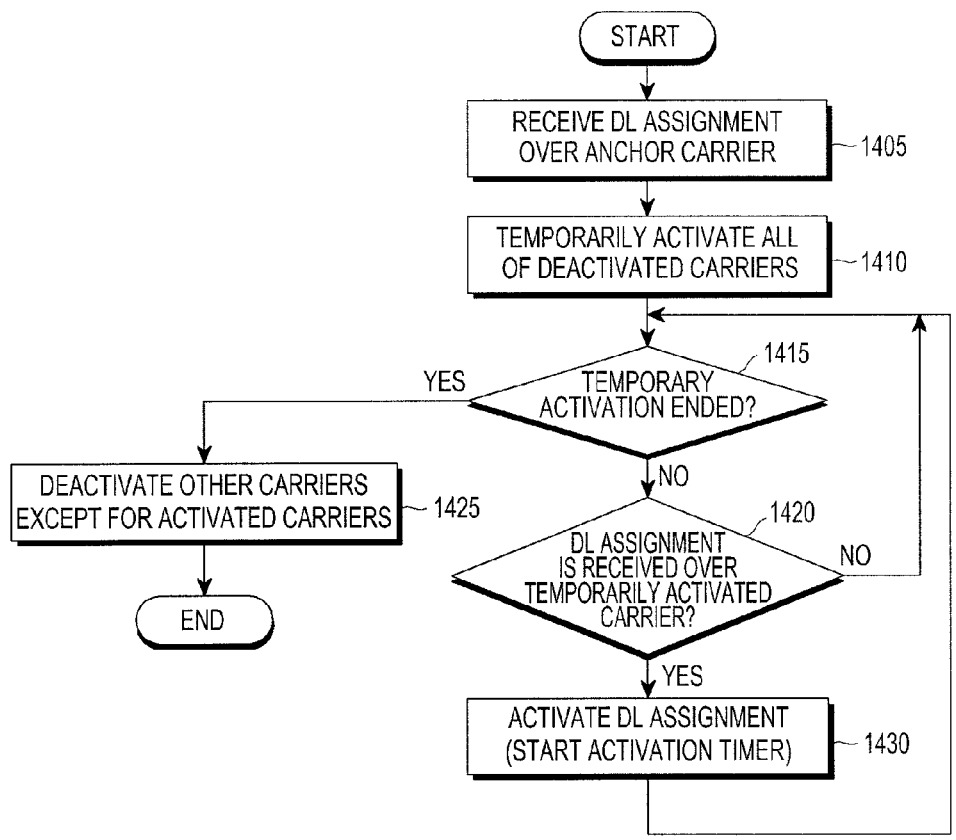
FIG. 14 is a flowchart illustrating an operation of a UE according to the fourth exemplary embodiment of the present invention.

FIG. 14 illustrates an operation of a UE according to the fourth exemplary embodiment of the present invention.

Referring now to FIG. 14, in step 1405, a UE 405 receives a DL assignment over a specific carrier. The specific carrier, a carrier always maintaining its activated state, may be an anchor carrier or a special carrier.

Upon receiving a DL assignment over an anchor carrier, which means reception of a command to temporarily activate all carriers having not been activated yet, the UE 405 temporarily activates all carriers not in an activated state among the configured carriers in step 1410. The temporarily activation means maintaining an activated state for a specific short period in order to receive a normal carrier activation command. The UE 405 may start a specific timer, for example, a temporary activation timer, and end the temporarily activated state if the timer expires. In step 1415, the UE 405 checks if the temporarily activated state is ended. It may be considered that the temporarily activated state is ended if, for example, the temporary activation timer expires. If the temporarily activated state has not been ended, the UE 405 proceeds to step 1420, and if the temporarily activated state has been ended, the UE 405 proceeds to step 1425.

In step 1420, the UE 405 checks whether a DL assignment for a temporarily activated carrier is received. Upon receiving a DL assignment for a temporarily activated carrier, which means reception of a command to normally activate the DL assignment, the UE 405 proceeds to step 1430. Upon failure to receive a DL assignment for the temporarily activated carrier, the UE 405 returns to step 1415 and checks whether the temporary activation is ended.

In step 1430, the UE 405 normally activates the DL carrier over which it has received the DL assignment during the temporary activation. Normal activation means maintaining an activated state for a comparatively long time compared with the temporary activation. In the normal activation, the UE 405 may start a specific timer, for example, a normal activation timer, and maintain the activated state until the timer expires, or until it explicitly receives a deactivation command from the ENB 410.

In step 1425, the UE 405 deactivates the carriers which are not normally activated, i.e., the carriers still being in the temporarily activated state, or the carriers over which the UE 405 has failed to receive a DL assignment while the temporary activation timer is in operation.

Fifth Exemplary Embodiment

An ENB 410 may transmit a DL assignment not for the purpose of activating other carriers, but for the purpose of transmitting data over a pertinent carrier. Even in this case, it is not preferable to activate other DL carriers. A fifth exemplary embodiment of the present invention provides a method of allowing a DL assignment to correspond to a carrier activation command only when the DL assignment includes predetermined specific information, for example, size information of DL data, thereby solving the above-mentioned problems.

Activating a carrier for an arbitrary UE 405 corresponds to an increase in the amount of DL data to be transmitted to the UE 405. Therefore, other carriers may be defined to be activated only when the amount of data scheduled using a DL assignment is greater than or equal to a specific reference value, or only when the amount of transmission resources scheduled using a DL assignment is greater than or equal to a specific reference value. To control the carrier activation more precisely, the amount of DL data scheduled using an arbitrary DL carrier and a combination of carriers indicated to be activated may be defined in advance. Table 1 below shows examples of the amount of DL data scheduled using an arbitrary DL carrier and the combination of carriers indicated to be activated.

TABLE 1

| Amount of data scheduled using DL assignment (size of MAC PDU) | Combination of activated carriers |
|---|---|
| $x_1$ | DL CC 2 |
| $x_2$ | DL CC 2, DL CC 3 |
| $x_3$ | DL CC 2, DL CC 3, DL CC 4 |
| ... | ... |
| $x_n$ | ALL DL CCs |

Also, the combination of activated carriers may be mapped to the number of scheduled resource blocks instead of the amount of data. Table 2 below shows examples of the number of scheduled resource blocks and the combination of activated carriers.

TABLE 2

| Amount of resources scheduled using DL assignment (number of resource blocks) | Combination of activated carriers |
|---|---|
| $n_1$ | DL CC 2 |
| $n_2$ | DL CC 2, DL CC 3 |
| $n_3$ | DL CC 2, DL CC 3, DL CC 4 |
| ... | ... |
| $n_n$ | ALL DL CCs |

If priorities of configured carriers are set in advance, the combination of activated carriers may be replaced with the number of carriers. For example, if priorities of configured carriers are set in order of DL CC 2, DL CC 3, DL CC 4, and DL CC 5, then a relationship between the amount of scheduled resources and the number of carriers to be additionally activated may be set in advance as shown in Table 3 below. Also, a relationship between the amount of scheduled data and the number of carriers to be additionally activated may be set in advance as shown in Table 4 below.

TABLE 3

| Amount of resources scheduled using DL assignment (number of resource blocks) | Number of activated carriers |
|---|---|
| $n_1$ | 1 |
| $n_2$ | 2 |
| $n_3$ | 3 |
| $n_4$ | 4 |

TABLE 4

| Amount of data scheduled using DL assignment (size of MAC PDU) | Number of activated carriers |
|---|---|
| $x_1$ | 1 |
| $x_2$ | 2 |
| $x_3$ | 3 |
| $x_4$ | 4 |

For example, upon receiving a DL assignment in which the number of resource blocks is n2 (or the amount of scheduled data is x2), a UE 405 additionally activates two carriers with higher priority among the carriers having not been activated yet. If DL CC 1 and DL CC 2 have already been activated, the UE 405 additionally activates DL CC 3 and DL CC 4 with higher priority among the carriers having not been activated yet.

Figure 15:
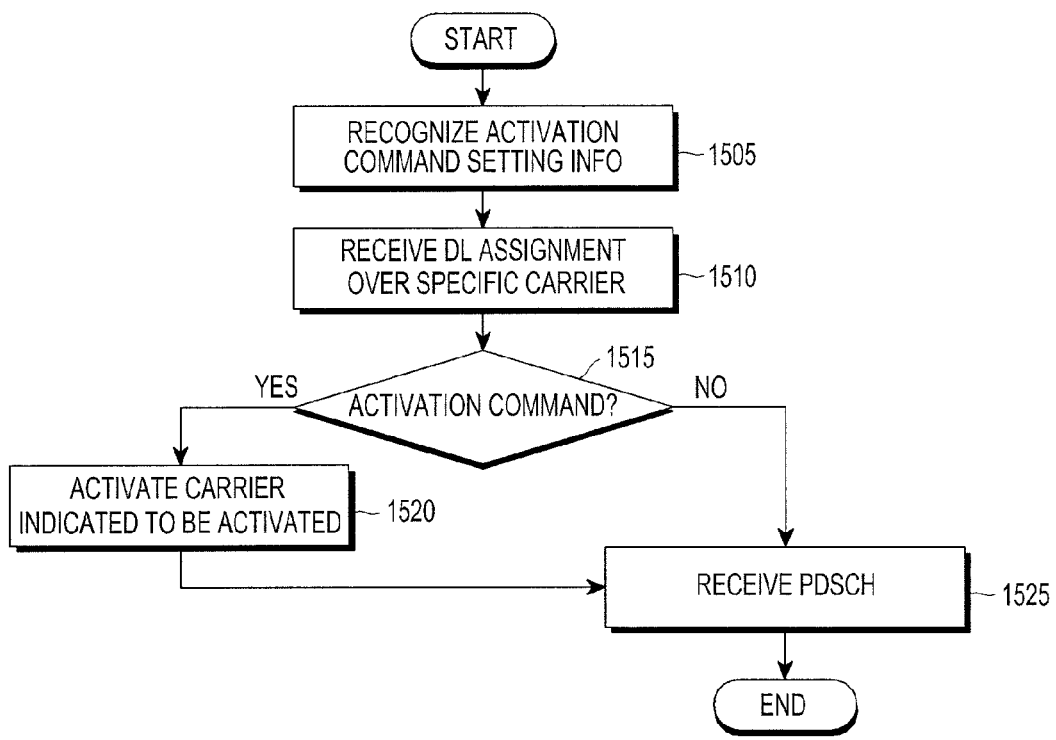
FIG. 15 is a flowchart illustrating an operation of a UE according to a fifth exemplary embodiment of the present invention.

FIG. 15 illustrates an operation of a UE according to the fifth exemplary embodiment of the present invention.

Referring now to FIG. 15, in step 1505, a UE 405 receives activation command setting information from an ENB 410.

The activation command setting information is information specifying relationships between the amount of data (or the amount of resources) scheduled using a DL assignment received from a specific DL carrier and the number of, or sets of, DL carriers to be activated. The activation command setting information may be defined to activate all DL carriers if, for example, the amount of data scheduled using a DL assignment is greater than or equal to X bits (or if the number of scheduled resource blocks is greater than or equal to a threshold n). The activation command setting information may be defined to activate a specific DL carrier(s) if the specific amount of data (or the specific number of resource blocks) is scheduled as shown in Tables 1, 2, 3, and 4. In this case, the activation command setting information is a set of unit information, and the unit information may be the amount of data (or the number resource blocks) scheduled using a DL assignment and a set of carriers to be activated, as defined in each row of Tables 1 and 2, or may be the amount of data (or the number resource blocks) scheduled using a DL assignment and the number of carriers to be additionally activated, as defined in each row of Tables 3 and 4. If the amount of scheduled data or the number of resource blocks is mapped to the number of carriers to be additionally activated as defined in Table 3 or 4, an ENB 410 informs a UE 405 of priority of each individual carrier using a control message.

Upon receiving a DL assignment from a specific carrier in step 1510, the UE 405 checks in step 1515 whether the DL assignment serves as a carrier activation command as well. If the amount of data or the number of resource blocks, scheduled by the received DL assignment, is equal to the amount of data or the number of resource blocks, predetermined by the activation command setting information, then the received DL assignment serves as a carrier activation command as well, and the UE 405 proceeds to step 1520. In step 1520, the UE 405 determines a carrier to be activated, based on the activation command setting information. For example, if the activation command setting information is configured to activate all DL carriers upon receiving a DL assignment of X bytes or more, the UE 450 activates all DL carriers upon receiving a DL assignment that schedules data of X bytes or more. If the activation command setting information is configured as defined in Table 1, the UE 405 activates a DL CC 2 upon receiving a DL assignment that schedules X1-byte data. If the activation command setting information is configured as defined in Table 2, the UE 405 activates carriers corresponding to a specific number of resource blocks upon receiving a DL assignment that schedules the specific number of resource blocks. If the activation information is configured as defined in Table 3, upon receiving a DL assignment scheduling specific data, the UE 405 additionally activates carriers, the number of which corresponds to the amount of scheduled data, in order of high priority, among the carriers being not activated presently. If the activation information is configured as defined in Table 4, upon receiving a DL assignment scheduling a specific number of resource blocks, the UE 405 additionally activates carriers, the number of which corresponds to the number of scheduled resource blocks, in order of high priority, among the carriers being not activated presently.

In step 1525, the UE 405 receives a PDSCH according to the PDSCH-related information included in the DL assignment.

Figure 16:
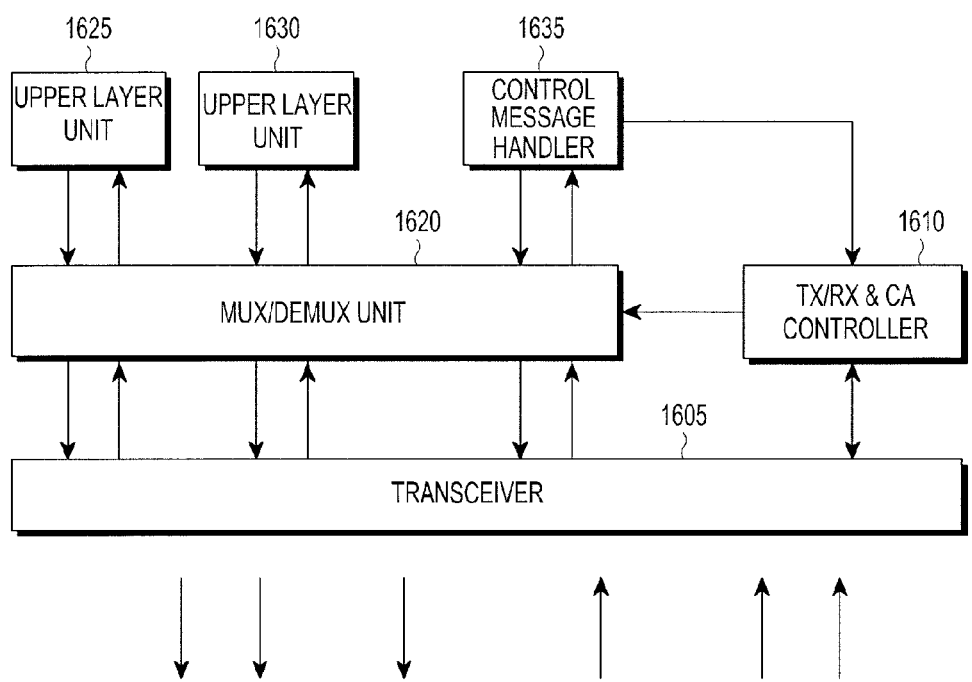
FIG. 16 is a diagram illustrating a UE to which the present invention is applied according to an exemplary embodiment of the present invention.

FIG. 16 illustrates a UE for the first to fifth exemplary embodiments of the present invention.

Referring now to FIG. 16, a UE includes a transceiver 1605, a transmission/reception and carrier activation (Tx/Rx & CA) controller 1610, a Multiplexing/Demultiplexing (MUX/DEMUX) unit 1620, a control message handler 1635, and various upper layer units 1625 and 1630.

The transceiver 1605 receives data and a specific control signal over a DL carrier, and transmits data and a specific control signal over a UL carrier. When a plurality of carriers are aggregated, the transceiver 1605 transmits/receives data and control signals over the plurality of carriers.

The transmission/reception and carrier activation controller 1610 controls the transceiver 1605 to transmit UL data or receive DL data according to the control signal, for example, the schedule command provided by the transceiver 1605. Upon receiving a DL assignment, the transmission/reception and carrier activation controller 1610 determines whether to activate carriers, depending on specific information in the received DL assignment. For example, in the first exemplary embodiment of the present invention, if a carrier indicator in the DL assignment indicates a carrier having not been activated yet, the transmission/reception and carrier activation controller 1610 controls the transceiver 1605 to activate the indicated carrier. In the second exemplary embodiment of the present invention, if the DL assignment is a carrier activation command, the transmission/reception and carrier activation controller 1610 activates carriers instructed to be activated, by analyzing a bitmap. In the third exemplary embodiment of the present invention, the transmission/reception and carrier activation controller 1610 activates the carriers belonging to the same group as that of the carrier indicated by the carrier indicator of the DL assignment. In the fourth exemplary embodiment of the present invention, upon receiving a DL assignment over a specific carrier, the transmission/reception and carrier activation controller 1610 temporarily activates the remaining carriers, and upon receiving a DL assignment for a specific carrier in the temporarily activated state, the transmission/reception and carrier activation controller 1610 normally activates the specific carrier. In the fifth exemplary embodiment of the present invention, the transmission/reception and carrier activation controller 1610 receives a DL assignment over a specific carrier, and activates specific carriers if the amount of data scheduled in the DL assignment is equal to a specific value (or falls within a specific range).

The MUX/DEMUX unit 1620 multiplexes the data generated in the upper layer units 1625 and 1630 or the control message handler 1635, or demultiplexes the data received from the transceiver 1605 and delivers the demultiplexed data to the appropriate upper layer units 1625 and 1630 or the control message handler 1635.

The control message handler 1635 handles a control message transmitted by the network and performs a required operation. The upper layer units 1625 and 1630 may be constructed for associated services independently. The upper layer units 1625 and 1630 process the data generated in user services such as a File Transfer Protocol (FTP) and a Voice over Internet Protocol (VoIP) and deliver the processed data to a MUX unit, or process the data transferred by a DEMUX unit and deliver the processed data to an upper-layer service application.

Sixth Exemplary Embodiment

Only some of a plurality of configured carriers may be in an activated state. That is, configured carriers operate in any one of an activated state and a deactivated state. In order to normally operate in configured carriers, a UE 405 periodically performs specific measurement on the configured carriers. The measurement means an action in which the UE 405 receives a signal from a target carrier instructed to be measured and measures strength of the signal at intervals of a specific period. Given that one of the major reasons defining the deactivated state is the minimization of power consumed in a deactivated carrier, performing measurement on activated carriers and deactivated carriers at the same period may significantly reduce the effects by the deactivated state.

A sixth exemplary embodiment of the present invention provides a method and apparatus of applying different measurement periods to activated carriers and deactivated carriers.

Prior to a description of the present exemplary embodiment, a process of measuring a specific carrier by a UE 405 will be described. The purpose of the measurement is to detect wireless channel conditions of a serving cell or its neighbor cells and make appropriate decisions. That is, the purpose is to make proper decisions for UE mobility support, etc., based on the measurement results on a specific measurement target such as a serving cell and its neighbor cells. Given the inaccuracy of the measurements implied in the UE 405, a measurement value filtered from instantaneous measurement values for a specific period is used instead of the instantaneous measurement values, for the decision making. The filtered measurement value is derived from the following Equation (1), and a UE calculates a filtered measurement result using the measurement results obtained by performing measurements for a specific period called a measurement period at a specific interval called a measurement interval. The filtered measurement result value may be calculated by Equation (1) below.

$$\text{filtered measurement result} = \alpha * \text{'measurement result for current measurement period'} + (1-\alpha) * \text{'filtered measurement result for previous measurement period'} \quad (1)$$

Figure 17:
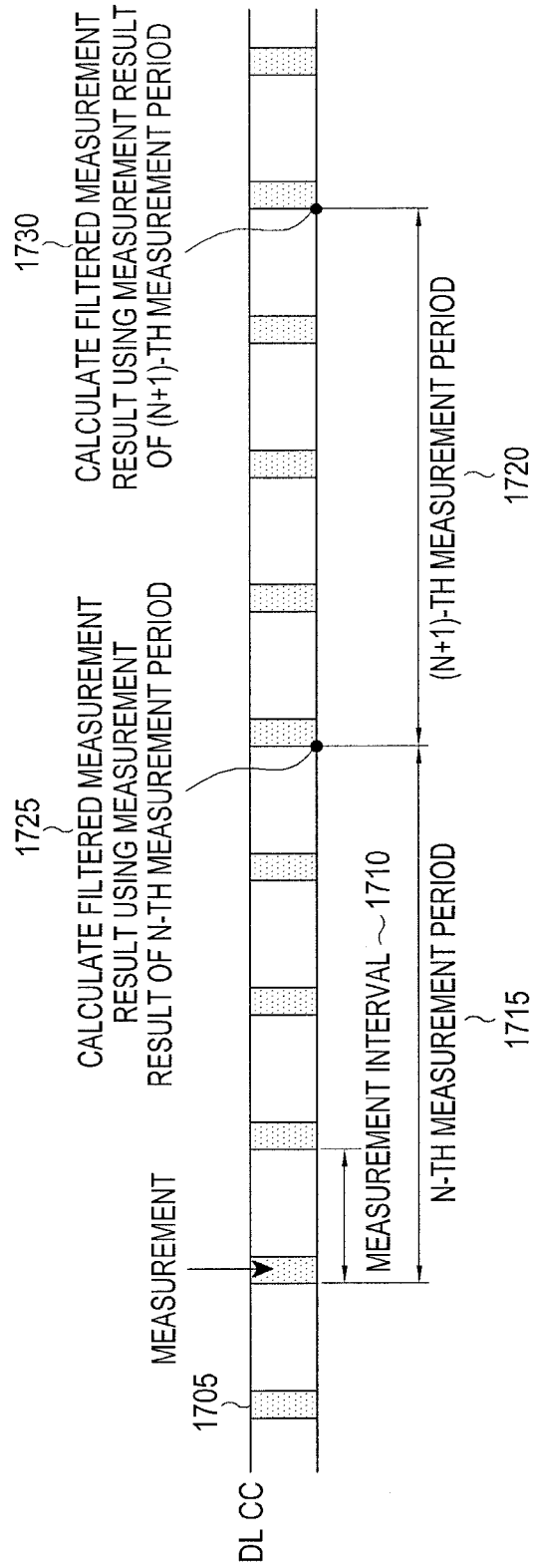
FIG. 17 is a diagram illustrating an example of a measurement process according to an exemplary embodiment of the present invention.

FIG. 17 illustrates an example of a measurement process according to an exemplary embodiment of the present invention.

Referring now to FIG. 17, for example, for an arbitrary N-th measurement period 1715, a UE 405 performs measurements 1705 a predetermined number of times, and calculates a filtered measurement result using one representative value, e.g., an average value, from the measurement results at a time 1725. This process is repeated in every measurement period, for example, (N+1)th measurement period 1720 and time 1730.

As illustrated, the measurement interval and the measurement period are information for controlling how frequently the UE 405 performs the measurement and how frequent the filtered measurement result is updated.

In the case of activated carriers, since DL/UL data transmission/reception may likely occur frequently, additional power consumption is not significant despite frequent measurement. On the other hand, in the case of deactivated carriers, the frequent measurement may cause significant additional power consumption, because the measurement is a unique event. In the present exemplary embodiment inspired by the above and other problems, different measurement periods and different measurement intervals are applied to the activated carriers and the deactivated carriers.

Figure 18:
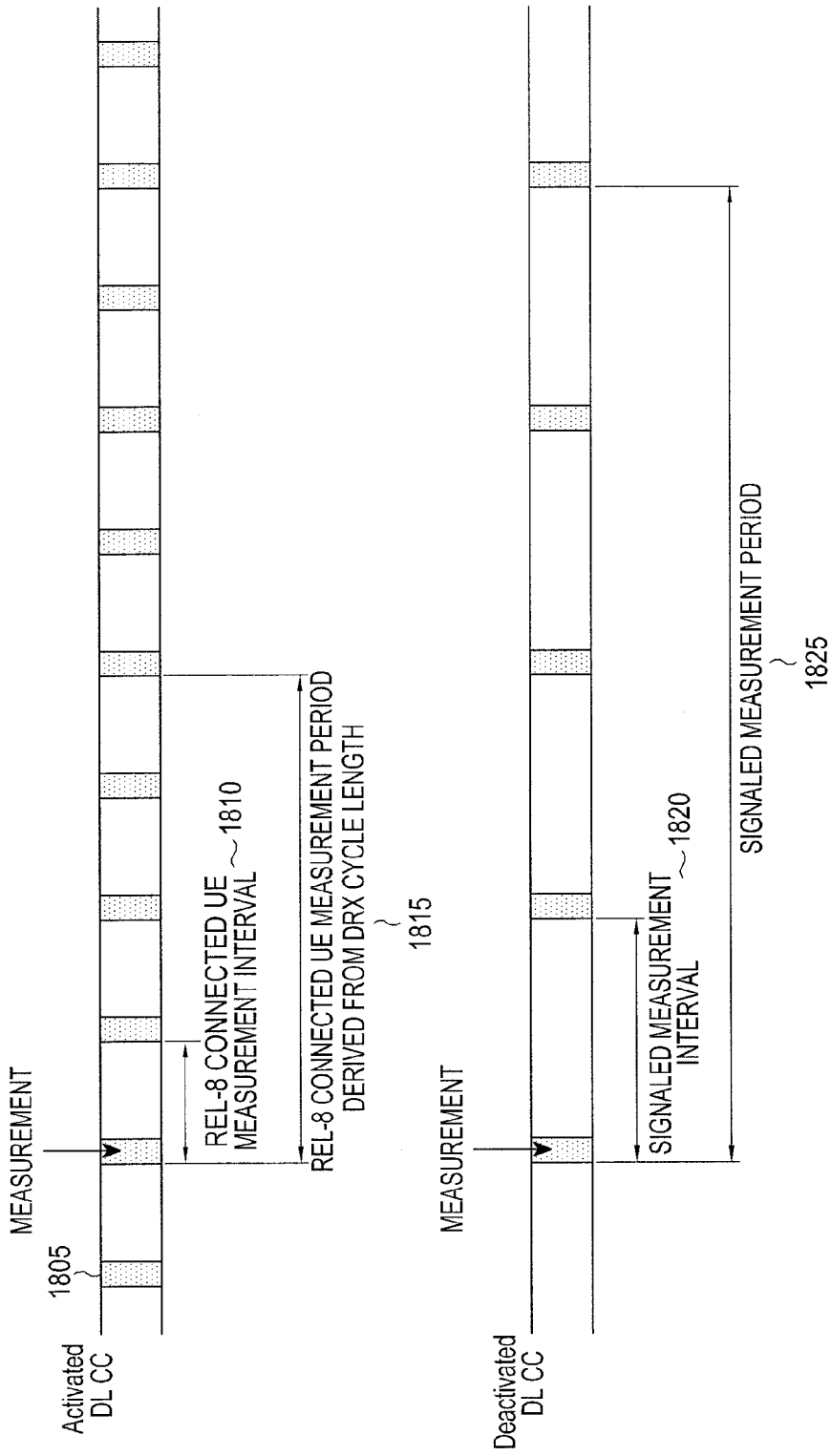
FIG. 18 is a diagram illustrating an example of an operation according to a sixth exemplary embodiment of the present invention.

FIG. 18 illustrates an example of an operation according to the sixth exemplary embodiment of the present invention.

Referring now to FIG. 18, describing the present exemplary embodiment in more detail, a measurement interval 1810 and a measurement period 1815, which were applied to a connected UE conventionally, are applied intact to an activated carrier. Conventionally, a connected UE adjusts a measurement interval and a measurement period according to a discontinuous reception (DRX) operation. So, there is no need to separately signal the measurement interval and the measurement period. On the other hand, it is preferable for a measurement interval and a measurement period of a deactivated carrier to be set as long values if possible, in order to minimize the power consumption of a UE, and the measurement interval and the measurement period should be set independently of the measurement interval and the measurement period being used in the activated carrier. In the present exemplary embodiment, a measurement interval 1820 and a measurement period 1825 for a deactivated carrier are explicitly signaled using a control message.

Figure 19:
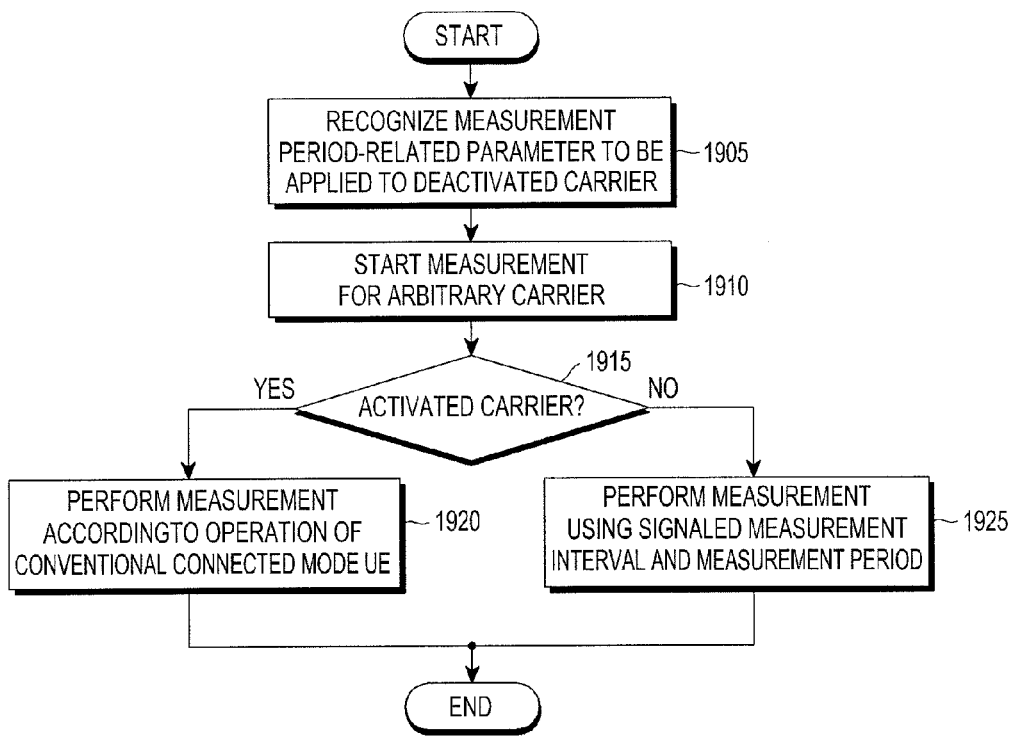
FIG. 19 is a flowchart illustrating an operation of a UE according to the sixth exemplary embodiment of the present invention.

FIG. 19 illustrates an operation of a UE according to the sixth exemplary embodiment of the present invention.

Referring now to FIG. 19, in step 1905, a UE 405 configures a new carrier using a carrier configuration message. The carrier configuration message includes a measurement interval and a measurement period as well, which are to be applied to a deactivated carrier. The two parameters may be signaled individually. Otherwise, only one parameter is signaled and the other parameter may be derived from the signaled parameter. For example, it is provided that a relationship between a measurement period and a measurement interval, as defined in Equation (2) below, is always satisfied.

$$\text{measurement period} = 5 * \text{measurement interval} \quad (2)$$

Even though only one parameter is signaled, the other parameter can be calculated from the signaled value.

In step 1910, the UE 405 starts measurement on the configured arbitrary carrier. In step 1915, the UE 405 checks if the carrier subjected to measurement is in an activated state or a deactivated state. In case of the activated state, the UE 405 determines a measurement interval and a measurement period to be applied, taking a DRX situation of the carrier into account, and performs measurement on the carrier in step 1920. If the carrier is in the deactivated state, the UE 405 performs measurement by applying a measurement interval and a measurement period instructed to be applied to the deactivated state in step 1925. That is, the UE 405 performs measurement on the carrier at every measurement interval, calculates a filtered measurement result using a representative value of the value measured at every measurement period, and makes decisions on mobility support or Channel Quality Indicator (CQI) of the UE 405 based on the calculated filtered measurement result value.

Seventh Exemplary Embodiment

Figure 20:
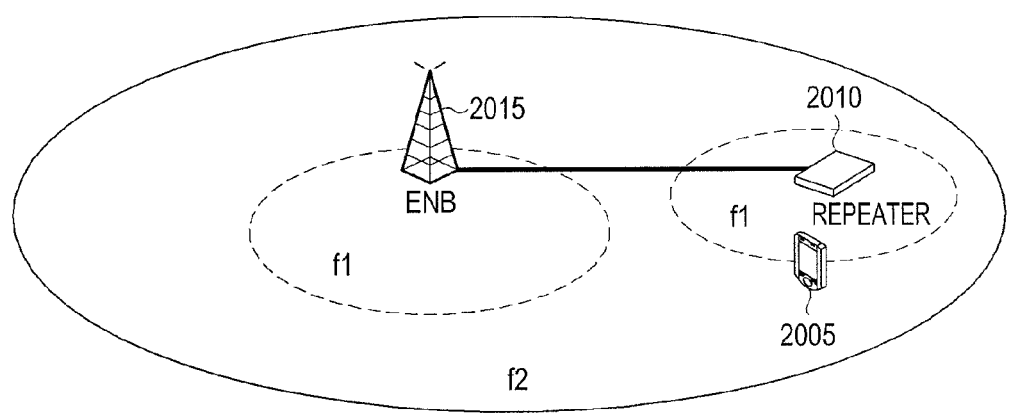
FIG. 20 is a diagram illustrating a mismatch between aggregated DL carriers in frame timing according to an exemplary embodiment of the present invention.

FIG. 20 illustrates a mismatch between aggregated DL carriers in frame timing according to an exemplary embodiment of the present invention.

Referring now to FIG. 20, CA is made between carriers transmitted from the same ENB. Since carriers transmitted from the same ENB have the same frame timing, it is not necessary to separately acquire frame timings of the aggregated carriers. However, in a special case where a repeater is used, even the signals transmitted from the same ENB may not be coincident with each other in frame timing. For instance, in the case where an arbitrary UE 2005 receives a carrier with a frequency f1 from a repeater 2010 and a carrier with a frequency f2 from an ENB 2015, a frame timing of the carrier f1 may be different from a frame timing of the carrier f2. When aggregating such carriers having different frame timings, the UE 2005 should acquire synchronization for the carriers. Acquiring synchronization for carriers means a process of receiving a Synchronization Channel (SCH) from a certain cell having a certain carrier and detecting a frame boundary of the cell through the cell search process described in 3GPP TS36.213. To receive a synchronization channel and detect a frame boundary, the UE 2005 should receive a signal of a pertinent carrier for a period of several to tens of milliseconds (msec). Hence, if the long measurement interval and measurement period for a deactivated carrier are applied, excessive time may be consumed in the synchronization acquisition process.

A seventh exemplary embodiment of the present invention provides a method, in which while transmitting a CA message to a UE, an ENB 2015 indicates its execution/non-execution of a DL synchronization process for an arbitrary carrier, and for a carrier instructed to perform the DL synchronization process, a UE 2005 operates as if a conventional connected UE non-supporting a DRX operation performs a synchronization process, instead of performing a synchronization process using the measurement interval and the measurement period for a deactivated carrier, for an initial specific period even in a deactivated state.

Figure 21:
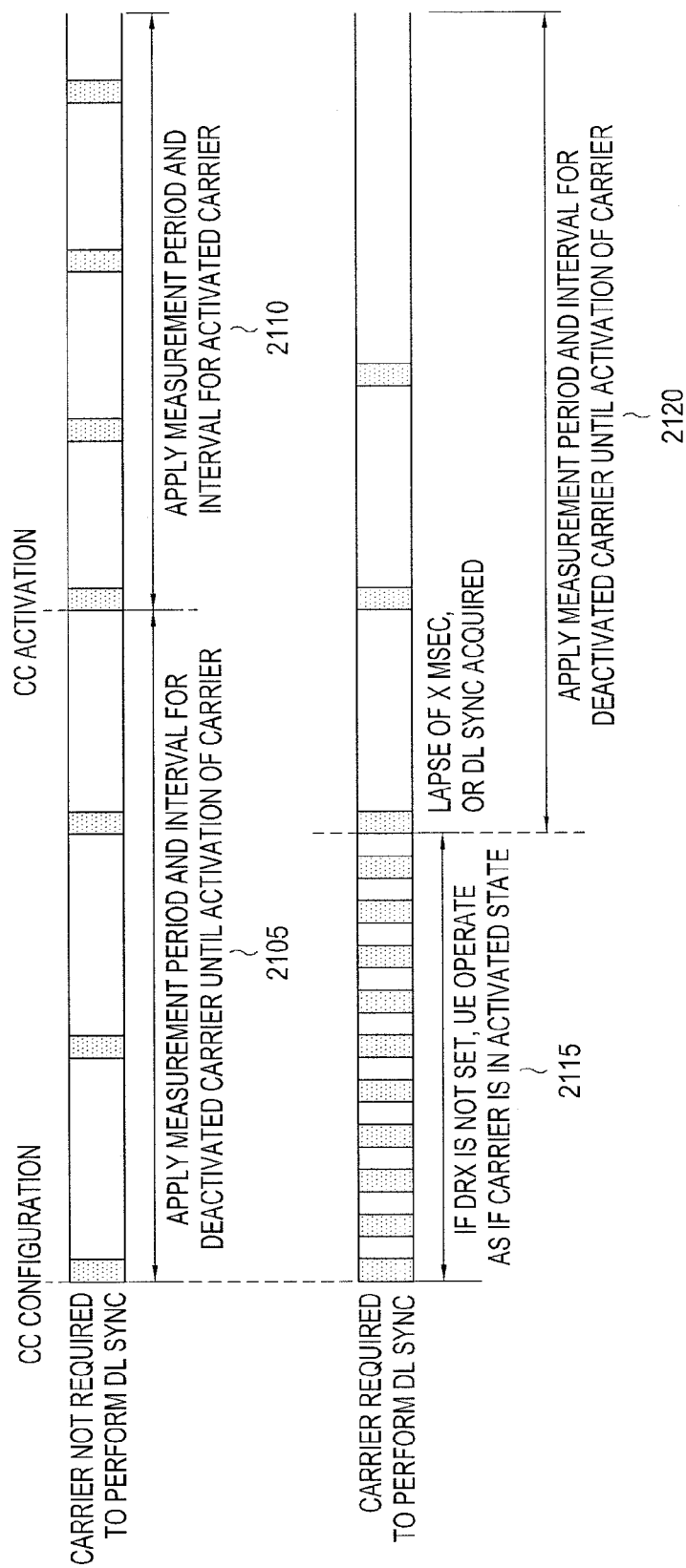
FIG. 21 is a diagram illustrating an example of an operation according to a seventh exemplary embodiment of the present invention.

FIG. 21 illustrates an example of an operation according to the seventh exemplary embodiment of the present invention.

Referring now to FIG. 21, in the seventh exemplary embodiment of the present invention, upon receiving a carrier configuration message, depending on whether a DL synchronization acquisition process is required for a newly configured carrier, a UE 2005 performs in step 2105 measurement using a measurement interval and a measurement period set for a deactivated state until the carrier is activated, if the DL synchronization acquisition process is not required, and performs in step 2110 measurement using a measurement interval and a measurement period set for an activation state once the carrier is activated. If the DL synchronization acquisition process for the newly configured carrier is required, the UE 2005 performs in step 2115 measurement using the shortest measurement interval for the first x msec, or until synchronization for the carrier is acquired. Because a connected UE non-supporting DRX performs measurement using the shortest measurement interval, it may be expressed that if the DL synchronization acquisition process for the newly configured carrier is required, the UE 2005 operates in step 2115 as if it is a connected UE non-supporting DRX, for the first x msec, or until synchronization for the carrier is acquired. Since then, the UE 2005 performs measurement using a measurement interval and a measurement period, which are set for the deactivated state, or if it makes transition to the activated state, the UE 2005 performs in step 2120 measurement using a measurement interval and a measurement period, which are set for the activated state. Step 2110 may be replaced with an operation of attempting synchronization acquisition by continuously receiving a signal of a pertinent carrier for the first x msec, or until acquisition for the carrier is acquired.

Figure 22:
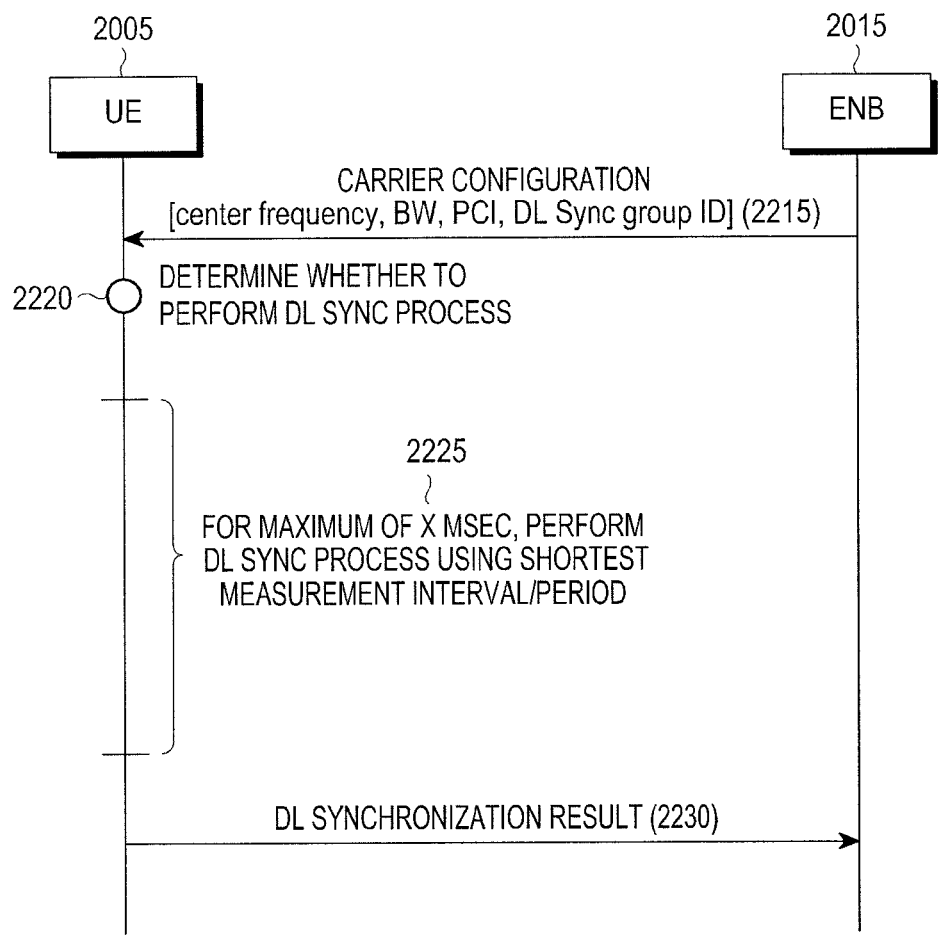
FIG. 22 is a flow diagram illustrating the overall operation according to the seventh exemplary embodiment of the present invention.

FIG. 22 illustrates the overall operation according to the seventh exemplary embodiment of the present invention.

Referring now to FIG. 22, upon determining to configure an arbitrary carrier for a UE 2005, an ENB 2015 transmits a carrier configuration message to the UE 2005 in step 2215. The carrier configuration message includes information related to a carrier to be configured, and a DL sync group ID of the carrier. The information related to a carrier to be configured includes, as described above, a center frequency, BW, PCI, etc. Strictly speaking, because aggregating or configuration carriers is equivalent to aggregating or configuration specific cells of the carriers, the terms carrier and carrier/cell are used in the meaning in the seventh exemplary embodiment of the present invention. The ENB 2015 may group carriers/cells sharing the same frame timing, and the DL sync group ID is information indicating a DL sync group to which an arbitrary DL carrier/cell belongs. If a DL carrier/cell is configured, which belongs to the same DL sync group as that of a carrier/cell whose DL sync has already been established, then the UE 2005, instead of establishing DL synchronization for the DL carrier/cell, determines that a frame timing of the newly configured DL carrier/cell has already been synchronized and is equal to a frame timing of a DL carrier/cell belonging to the same DL sync group. If a DL carrier/cell is configured, which belongs to a DL sync group whose synchronization has not been established, the UE 2005 performs a DL synchronization process with the newly configured DL carrier/cell.

In step 2220, the UE 2005 determines whether to perform a DL synchronization process by checking a DL sync group ID of the newly configured DL carrier/cell. If there is no carrier/cell belonging to the DL sync group to which the newly configured DL carrier/cell belongs, among the carriers/cells whose synchronization has already been established and maintained, the UE 2005 performs a DL synchronization process for the newly configured DL carrier/cell in step 2225. The DL synchronization process is a process of detecting a frame timing by receiving a synchronization channel of a newly configured carrier/cell, and in this process, the UE 2005 receives a signal by applying the shortest measurement interval to the newly configured carrier. If synchronization for the carrier/cell has been established or a specific time of x msec has elapsed, the UE 2005 stops applying the shortest measurement interval and performs measurement using a measurement interval and a measurement period for a deactivated carrier. The reason for limiting an upper limit of a period to which the shortest measurement interval is applied, to x msec is to prevent the UE 2005 from failing to acquire DL synchronization for a long time because of the poor channel condition of a DL carrier whose DL synchronization should be established. Upon establishing DL synchronization for a pertinent carrier, or upon failure to establish DL synchronization for a pertinent carrier for x msec, the UE 2005 transmits a message reporting the success/failure of establishment of DL synchronization to the ENB 2015 in step 2230. The ENB 2015 does not activate the DL carrier that has failed in establishment of DL synchronization, until establishment of DL synchronization is successful.

Figure 23:
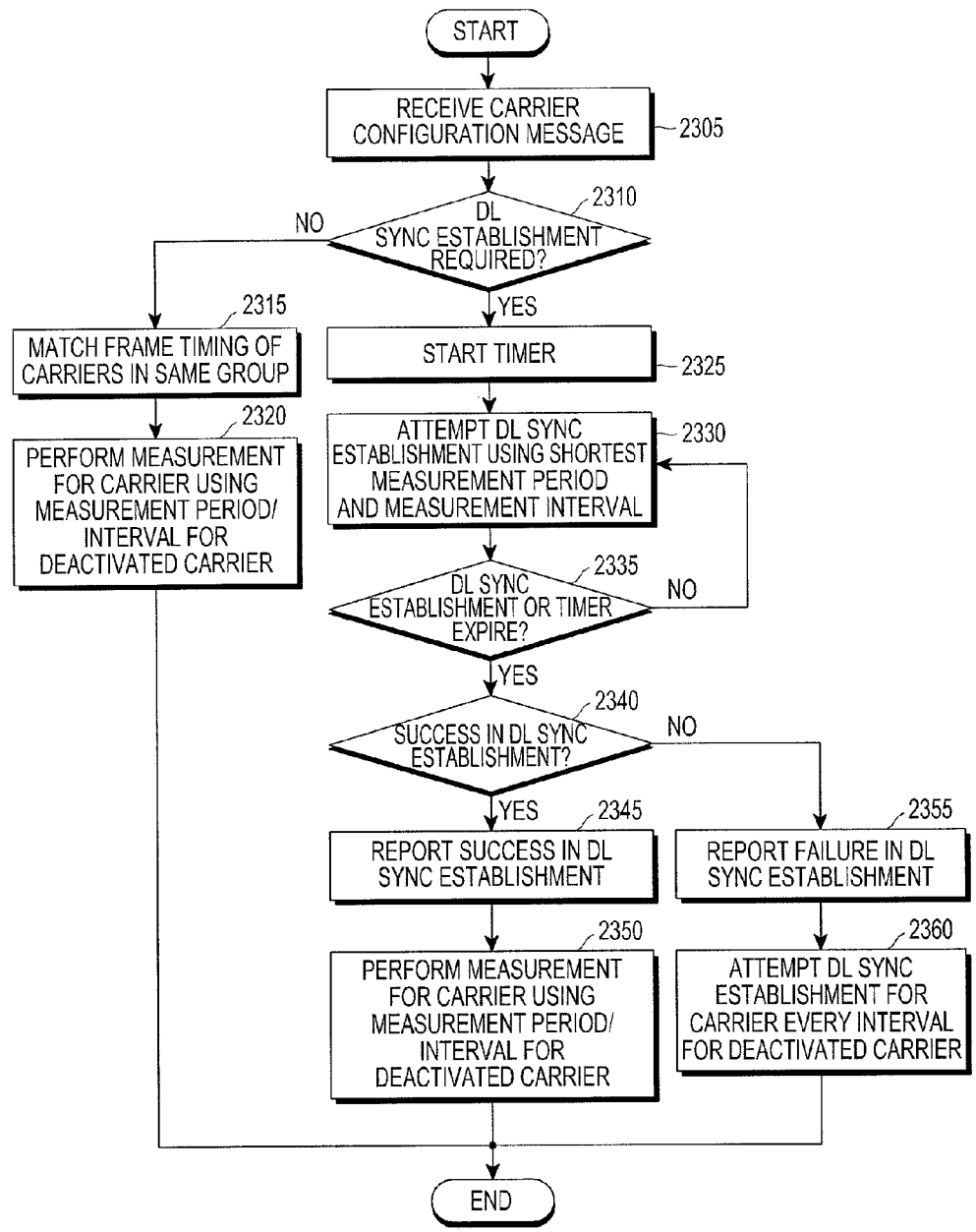
FIG. 23 is a flowchart illustrating an operation of a UE according to the seventh exemplary embodiment of the present invention.

FIG. 23 illustrates an operation of a UE according to the seventh exemplary embodiment of the present invention.

Referring now to FIG. 23, in step 2305, a UE 2005 receives a carrier configuration message. The carrier configuration message includes information related to a DL carrier/cell instructed to be configured, an ID of a DL sync group to which a DL carrier/cell belongs, timer information, etc.

In step 2310, the UE 2005 determines whether to perform DL synchronization process by checking a DL sync group ID of the DL carrier/cell to be newly configured. If there is a DL carrier/cell belonging to the DL sync group to which the DL carrier/cell to be newly configured belongs, among the DL carriers/cells whose DL synchronization is being maintained, then the UE 2005 proceeds to step 2315. If there is no DL carrier/cell belonging to the DL sync group of the DL carrier/cell to be newly configured, among the DL carriers/cells whose DL synchronization is being maintained, then the UE 2005 proceeds to step 2325. In step 2315, the UE 2005 matches a frame timing of the newly configured DL carrier/cell to a frame timing of a carrier/cell whose synchronization is being maintained and which belongs to the same DL sync group. In step 2320, the UE 2005 performs measurement on the carrier/cell using a measurement interval and a measurement period for a deactivated carrier until it receives an activation command for the carrier/cell.

The UE starts a timer in step 2325, and performs a specific operation to establish DL synchronization for the newly configured carrier/cell in step 2330. To be specific, the specific operation is an operation of acquiring a frame timing by receiving a synchronization channel from an indicated cell with the newly configured carrier. In performing this operation, the UE 2005 considers that the carrier is an activated carrier with DRX being not set, in order to use the shortest measurement interval in receiving a signal of the carrier/cell. If establishment of DL synchronization is successful or the timer expires in step 2335, the UE 2005 proceeds to step 2340, and upon failure in establishment of DL synchronization, the UE 2005 returns to step 2330 and continues to attempt the DL synchronization establishment. In step 2340, the UE 2005 checks whether DL synchronization establishment is successful. If successful, the UE 2005 reports the success in DL synchronization establishment in step 2345. In step 2350, the UE 2005 performs measurement on the carrier using a measurement interval and a measurement period for a deactivated carrier until it receives an activation command for the carrier. Upon failure in DL synchronization establishment, the UE 2005 reports the fail in DL synchronization establishment to the ENB 2015 in step 2355. In step 2360, the UE 2005 attempts DL synchronization establishment at intervals of a measurement interval for a deactivated carrier.

Eighth Exemplary Embodiment

If a measurement period and a measurement interval for a deactivated carrier are set longer than a measurement period and a measurement interval for an activated carrier as in the sixth exemplary embodiment of the present invention, a filtered measurement result of a deactivated carrier may be updated more slowly than a filtered measurement result of an activated carrier, causing problems especially when the deactivated carrier is a carrier having the best channel condition. For example, if a deactivated carrier has the best channel condition and a filtered measurement result of a carrier having the best channel condition is used in making decision on mobility, even though a channel condition of a carrier, which was deactivated despite its best channel condition, deteriorates abruptly later, the deteriorated channel condition may be slowly reflected in the filtered measurement result because of the long measurement interval and measurement period for a deactivated carrier. While the deteriorated channel condition is not reflected in the filtered measurement result, a UE may misjudge a carrier having the best channel condition, thus making wrong decisions.

To address the above and other problems, an eighth exemplary embodiment of the present invention provides a method in which if a carrier having the best channel condition is in a deactivated state, a UE notifies it to an ENB.

Figure 24:
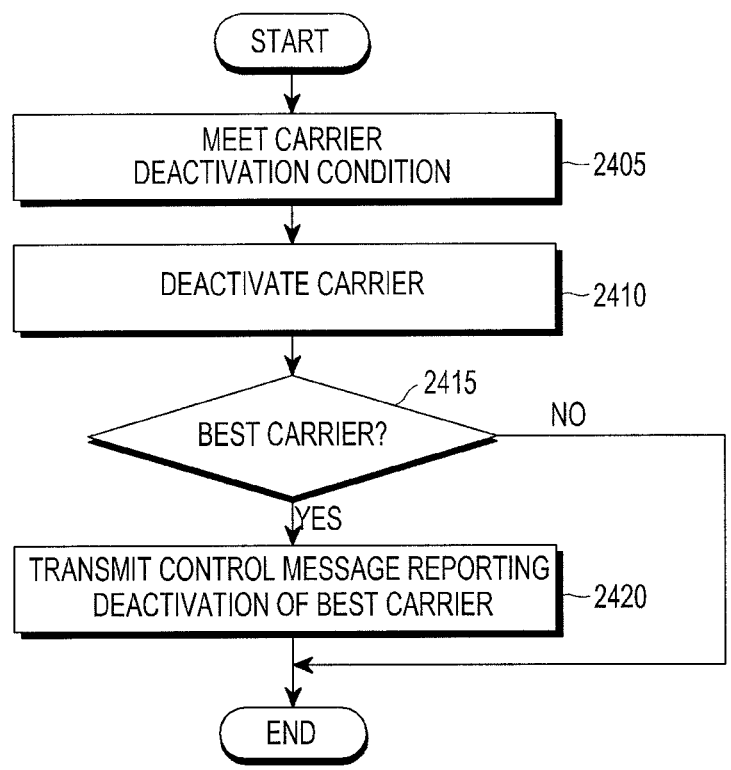
FIG. 24 is a flowchart illustrating an operation of a UE according to an eighth exemplary embodiment of the present invention.

FIG. 24 illustrates an operation of a UE according to the eighth exemplary embodiment of the present invention.

Referring now to FIG. 24, in step 2405, a deactivation condition of an arbitrary activated carrier is met for a UE 2005. For example, the deactivation condition may represent a lapse of a predetermined time after the carrier is activated. The UE 2005 deactivates a carrier meeting the deactivation condition in step 2410, and checks in step 2415 whether the deactivated carrier is a carrier having the best channel condition among the configured carriers. A carrier having the best channel condition may mean that the carrier has the best filtered measurement result for its Reference Signal Received Power (RSRP). If the carrier meeting the deactivation condition has the best channel condition, the UE 2005 transmits a control message reporting the deactivation of the best carrier to an ENB 2015 in step 2420, and then ends the process. The control message may include information such as a PCI of a carrier deactivated and having the best channel condition and a filtered measurement result for RSRP of the carrier. If the deactivated carrier is not a best carrier, the UE 2005 ends the process.

Another example of the eighth exemplary embodiment of the present invention provides a method in which if a deactivation condition for a carrier having the best channel condition is met, a UE reports it to an ENB and maintains an activated state thereof.

Figure 25:
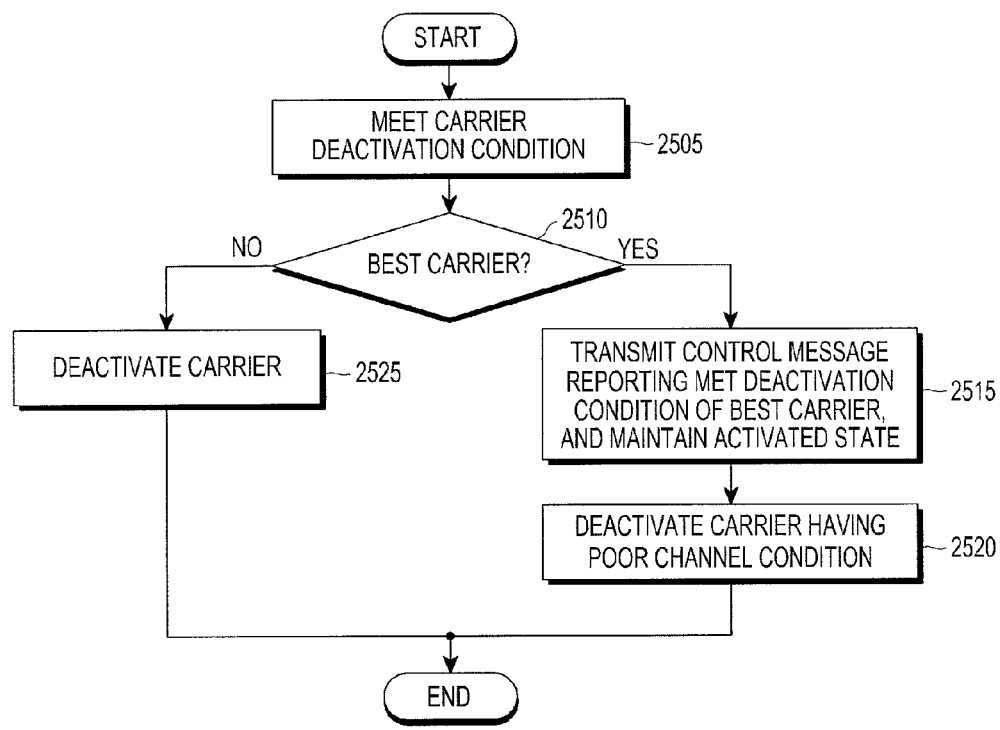
FIG. 25 is a flowchart illustrating another operation of a UE according to the eighth exemplary embodiment of the present invention.

FIG. 25 illustrates another operation of a UE according to the eighth exemplary embodiment of the present invention.

Referring now to FIG. 25, in step 2505, a deactivation condition of an arbitrary activated carrier is met for a UE 2005. For example, the deactivation condition may represent a lapse of a predetermined time after the carrier is activated. The UE 2005 checks in step 2510 whether the carrier meeting the deactivation condition is a carrier having the best channel condition, among the configured carriers. If a deactivation condition of the carrier having the best channel condition is met, the UE 2005 transmits a control message reporting the met deactivation condition of the best carrier to an ENB in step 2515. The control message may include information such as a PCI of a carrier having the best channel condition and meeting the deactivation condition. In step 2515, the UE 2005 continues to perform measurement by applying a measurement period and a measurement interval for an activated state to the related cell while maintaining the activated state of the carrier. In step 2520, if the channel condition of the carrier becomes poorer than channel conditions of other carriers, the UE 2005 deactivates the carrier. If the carrier meeting the deactivation condition is not a best carrier in step 2510, the UE 2005 deactivates the carrier in step 2525.

Figure 26:
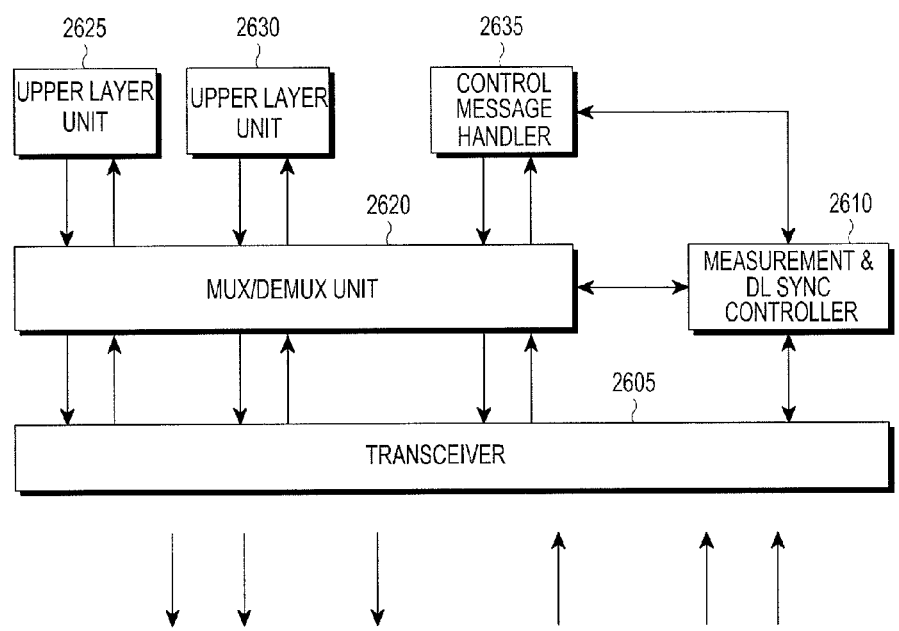
FIG. 26 is a diagram illustrating a UE according to an exemplary embodiment of the present invention.

FIG. 26 illustrates a UE for the sixth, seventh, and eighth exemplary embodiments of the present invention.

Referring now to FIG. 26, a UE includes a transceiver 2605, a measurement & DL sync controller 2610, a MUX/DEMUX unit 2620, a control message handler 2635, and various upper layer units 2625 and 2630.

The transceiver 2605 receives data and a specific control signal over a DL carrier, and transmits data and a specific control signal over a UL carrier. When a plurality of carriers are aggregated, the transceiver 2605 transmits/receives data and control signals over the plurality of carriers.

The control message handler 2635 performs a required operation by analyzing a control message received from an ENB. In the sixth exemplary embodiment of the present invention, the control message handler 2635 delivers information such as a DRX interval and a measurement interval and a measurement period for a deactivated carrier, which are included in the received control message, to the measurement & DL sync controller 2610. In the seventh exemplary embodiment of the present invention, the control message handler 2635 adds a DL sync group ID of a DL carrier to be newly configured to the above information in the received control message.

If needed, the control message handler 2635 generates a control message and delivers it to a lower layer. In the eighth exemplary embodiment of the present invention, if the measurement & DL sync controller 2610 notifies 'the met deactivation condition of the best carrier' or 'the deactivation of the best carrier', the control message handler 2635 generates a control message and reports it to an ENB 2015. In the eighth exemplary embodiment of the present invention, the control message may be generated in a MAC layer. In this case, if the deactivation condition of the best carrier is met or the best carrier is deactivated, the measurement & DL sync controller 2610 reports it to the MUX/DEMUX unit 2620, and the MUX/DEMUX unit 2620 generates a control message and reports it to the ENB 2015.

The measurement & DL sync controller 2610 instructs a receiver to perform measurement at a required time, and calculates and manages a filtered measurement result by collecting the measurement results. In the sixth exemplary embodiment of the present invention, the measurement & DL sync controller 2610 determines a time for measurement considering the activated/deactivated state of each carrier, and controls a receiver for the related carrier to receive a signal at the pertinent time. In the seventh exemplary embodiment of the present invention, the measurement & DL sync controller 2610 determines the necessity/non-necessity of DL synchronization establishment of a newly configured carrier, and in case of the necessity of DL synchronization establishment, the measurement & DL sync controller 2610 controls the receiver to continuously receive a signal for the carrier. Upon establishment of DL synchronization, the measurement & DL sync controller 2610 controls the receiver to perform measurement using appropriate measurement period and measurement interval. In the eighth exemplary embodiment of the present invention, if a carrier deactivated or meeting a deactivation condition is the best carrier, the measurement & DL sync controller 2610 reports it to the control message handler 2635 or the MUX/DEMUX unit 2620.

The MUX/DEMUX unit 2620 multiplexes the data generated in the upper layer units 2625 and 2630 or the control message handler 2635, or demultiplexes the data received from the transceiver 2605 and delivers the demultiplexed data to the appropriate upper layer units 2625 and 2630 or the control message handler 2635.

The upper layer units 2625 and 2630, which may be made for associated services individually, process the data generated in user services such as FTP and VoIP, and deliver the processed data to a MUX unit, or process the data transferred by a DEMUX unit and deliver the processed data to an upper-layer service application.

Ninth Exemplary Embodiment

Figure 27:
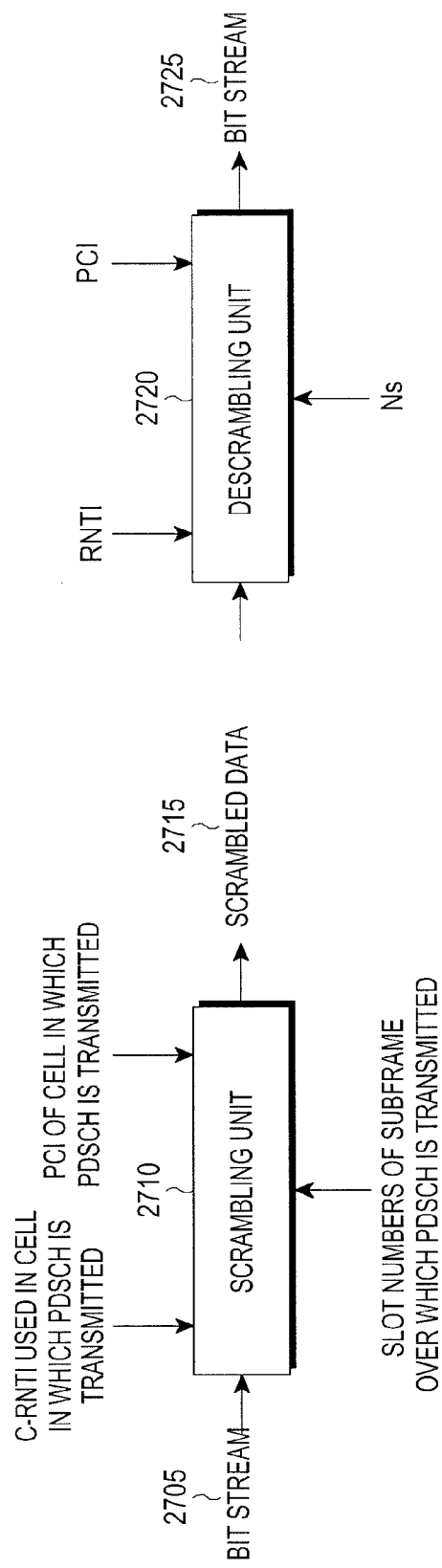
FIG. 27 is a diagram illustrating a process of scrambling and descrambling a DL traffic channel according to an exemplary embodiment of the present invention.

FIG. 27 illustrates a process of scrambling and descrambling a DL traffic channel according to an exemplary embodiment of the present invention.

In a CA system, a new type of carrier is defined, which is called an extension carrier in which there is no synchronization channel with a PDCCH. The extension carrier provides only a PDSCH, and a DL assignment is provided over a DL PDCCH of another carrier. User data transmitted over the PDSCH is scrambled for a reduction in inter-cell interference. This process will be described in more detail with reference to FIG. 27. Referring now to FIG. 27, an ENB 2015 inputs a bit stream 2705 to be transmitted to a user, to a specific scrambling unit 2710, and the scrambling unit 2710 converts the bit stream 2705 into scrambled data 2715 using specific parameters and a specific algorithm. If the scrambled data 2715 is transmitted to a UE 2005, the UE 2005 inputs the received data to a descrambling unit 2720. The descrambling unit 2720 converts the descrambled data into its original bit stream 2725 using specific parameters and a specific algorithm. The parameters being input in the scrambling and descrambling processes include RNTI, PCI, and Ns. The RNTI is an ID called a C-RNTI that the UE 2005 uses in a cell where the PDSCH is transmitted/received. The PCI is a PCI of the cell where the PDSCH is transmitted/received. Ns is slot numbers of a subframe over which the PDSCH is transmitted. One subframe includes two slots, one radio frame includes twenty slots, and every slot is assigned a unique number ranging between 0 and 19. Ns is the slot numbers of the subframe.

It is natural that the above three parameters are required to transmit/receive a PDSCH over an extension carrier. In the extension carrier, since there is no synchronization channel, the slot numbers Ns do not exist as well. For descrambling, a method of defining a PCI and a C-RNTI for an extension carrier and signaling them to a UE 2005 may be used, but this may cause an increase in PCI/C-RNTI management cost and signaling overhead. In scrambling/descrambling a PDSCH transmitted/received over an extension carrier, the present exemplary embodiment uses the C-RNTI, PCI, and Ns of the cell in which a DL assignment is transmitted/received, instead of the PDSCH, thereby solving the above problems.

In summary, in the ninth exemplary embodiment of the present invention, for scrambling/descrambling of a PDSCH transmitted/received over an extension carrier, a UE ID (C-RNTI) used in the cell from which a DL assignment is received, a PCI of the cell from which a DL assignment is received, and slot numbers Ns of the subframe over which a DL assignment is received.

Figure 28:
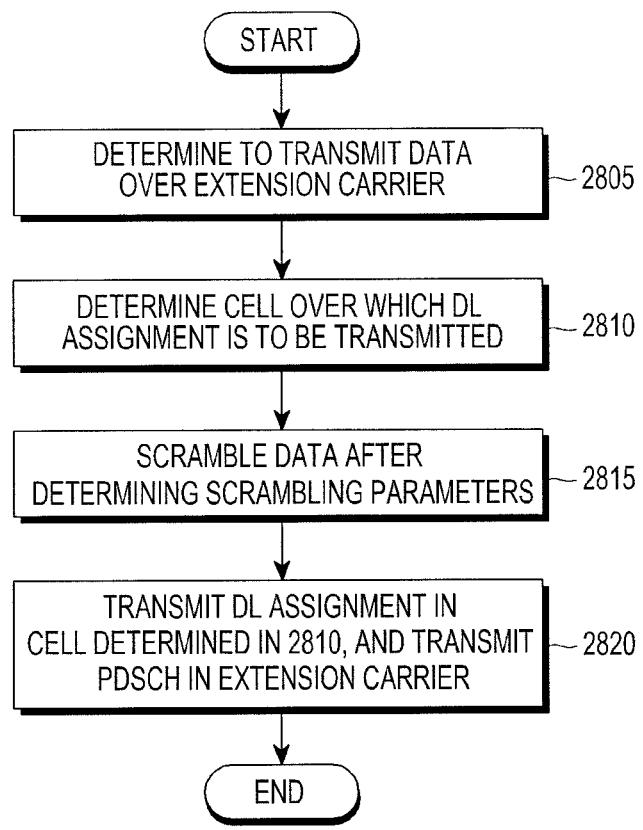
FIG. 28 is a flowchart illustrating an operation of an Evolved Node B (ENB) according to a ninth exemplary embodiment of the present invention.

FIG. 28 illustrates an operation of an ENB according to the ninth exemplary embodiment of the present invention.

Referring now to FIG. 28, in step 2805, an ENB 2015 determines to transmit a PDSCH to an arbitrary UE 2005 over an extension carrier. The ENB 2015 determines a carrier/cell, through a PDCCH of which it will transmit a DL assignment for PDSCH scheduling of an extension carrier, in step 2810, and scrambles the PDSCH using parameters to be applied for scrambling of the PDSCH in step 2815. The parameters include a UE ID used in the cell in which a DL assignment is to be transmitted, a PCI of the cell in which a DL assignment is to be transmitted, and slot numbers Ns of a subframe over which a DL assignment is to be transmitted. In step 2820, the ENB 2015 transmits a PDSCH over an extension carrier in a subframe whose transmission was scheduled in step 2185, and transmits a DL assignment over the carrier/cell determined in step 2810.

Figure 29:
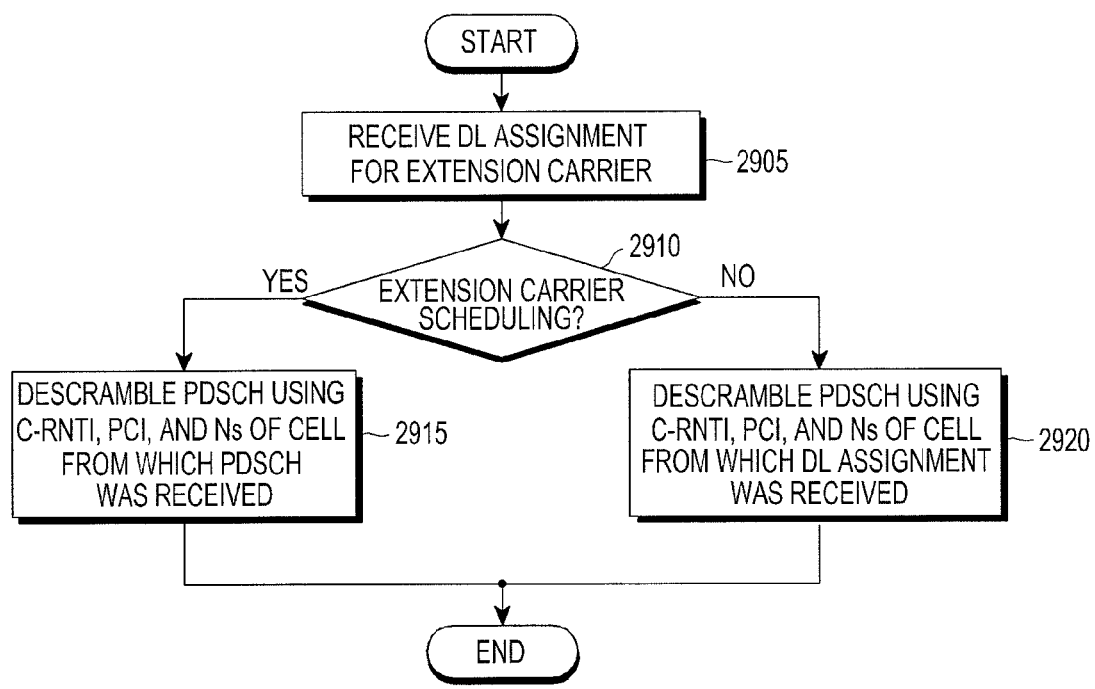
FIG. 29 is a flowchart illustrating an operation of a UE according to the ninth exemplary embodiment of the present invention.

FIG. 29 illustrates an operation of a UE according to the ninth exemplary embodiment of the present invention.

Referring now to FIG. 29, in step 2905, a UE 2005 receives a DL assignment. In step 2910, the UE 2005 checks if the received DL assignment is a DL assignment for scheduling a PDSCH of an extension carrier. For example, if a carrier indicator in the received DL assignment indicates a carrier ID of an extension carrier, the DL assignment is a DL assignment for scheduling a PDSCH of an extension carrier.

If the received DL assignment is a DL assignment for scheduling a PDSCH of an extension carrier, the UE 2005 proceeds to step 2915, and if the received DL assignment is not a DL assignment for scheduling a PDSCH of an extension carrier, the UE 2005 proceeds to step 2920.

In step 2915, the UE 2005 descrambles a received PDSCH using a UE ID used in the cell from which the PDSCH is received, a PCI of the cell from which the PDSCH is received, and slot numbers Ns of a subframe over which the PDSCH is received.

In step 2920, the UE 2005 descrambles a received PDSCH using a UE ID used in the cell from which a DL assignment is received, a PCI of the cell from which a DL assignment is received, and slot numbers Ns of a subframe over which a DL assignment is received. The UE ID used in the cell from which a DL assignment is received may be a C-RNTI used for masking of a DL assignment.

Figure 30:
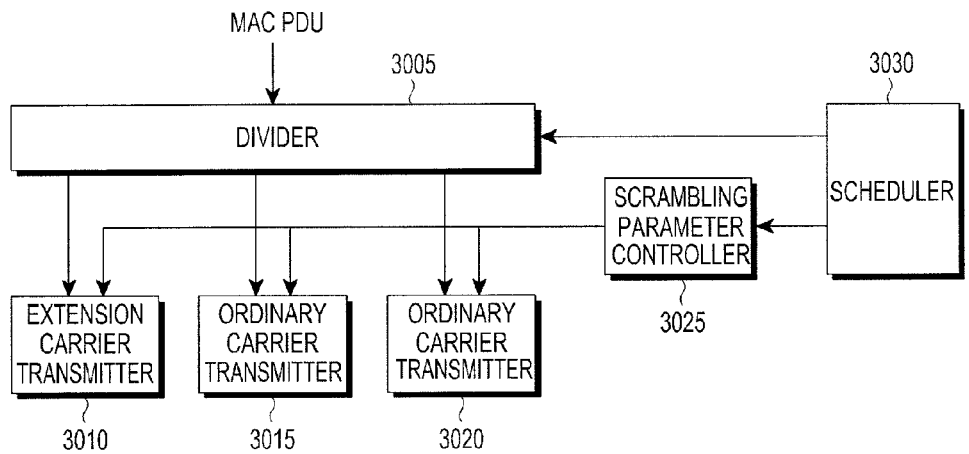
FIG. 30 is a diagram illustrating an ENB for the ninth exemplary embodiment of the present invention.

FIG. 30 illustrates an ENB for the ninth exemplary embodiment of the present invention.

Referring now to FIG. 30, an ENB includes a divider 3005, an extension carrier transmitter 3010, a plurality of ordinary carrier transmitters 3015 and 3020, a scrambling parameter controller 3025, and a scheduler 3030.

The scheduler 3030 makes decisions on scheduling taking into account the amount of DL traffic, the channel condition of a UE, etc. That is, the scheduler 3030 determines the time at which it will transmit data, the UE to which it will transmit data, the carrier through which it will transmit data, and the amount of data it will transmit. Upon determining to transmit DL data to an arbitrary UE, the scheduler 3030 determines through which carrier it will transmit the data. Upon determining to transmit the data through an extension carrier, the scheduler 3030 determines a carrier through which it will transmit a DL assignment. By notifying the decisions to the divider 3005 and an upper layer (not shown in the drawing), the scheduler 3030 controls the upper layer to generate data in an indicated size and deliver it to the divider 3005. The divider 3005 delivers the data provided from the upper layer to an appropriate transmitter under control of the scheduler 3030. The scheduler 3030 notifies the scheduling-related decisions to the scrambling parameter controller 3025, and if the DL data is transmitted through an ordinary carrier, the scrambling parameter controller 3025 delivers PCI, C-RNTI, and Ns for the cell in which a PDSCH is transmitted, to a transmitter for the carrier. The transmitter scrambles data using the parameters, and transmits the scrambled data in the carrier through a specific procedure. If the DL data is transmitted through an extension carrier, the scrambling parameter controller 3025 delivers PCI, C-RNTI, and Ns for the cell in which a DL assignment is transmitted, to a transmitter for the carrier. The transmitter performs an operation of scrambling data using the parameters.

Figure 31:
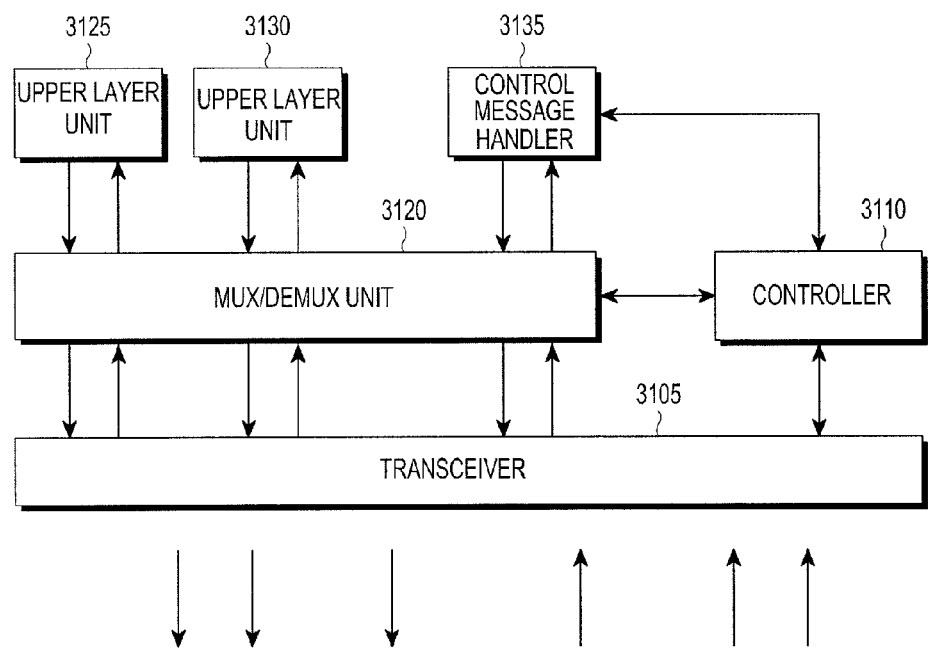
FIG. 31 is a diagram illustrating a UE for the ninth exemplary embodiment of the present invention.

FIG. 31 illustrates a UE for the ninth exemplary embodiment of the present invention.

Referring now to FIG. 31, a UE includes a transceiver 3105, a controller 3110, a MUX/DEMUX unit 3120, a control message handler 3135, and various upper layer units 3125 and 3130.

The transceiver 3105 receives data and a specific control signal over a DL carrier, and transmits data and a specific control signal over a UL carrier. If a plurality of carriers are aggregated, the transceiver 3105 transmits/receives data and control signals over the plurality of carriers.

The control message handler 3135 analyzes a control message received from an ENB 2015, and performs a necessary operation. Upon receiving a specific control message, the control message handler 3135 checks UE IDs to be used in an ordinary carrier for individual carriers independently, and delivers them to the controller 3110.

The controller 3110 receives a DL assignment, determines from which carrier it should receive a PDSCH, and controls the transceiver 3105 to receive the PDSCH from the determined carrier. If the carrier from which a PDSCH is to be received is an extension carrier, the controller 3110 controls the transceiver 3105 to descramble the PDSCH using C-RNTI, PCI, and Ns for the cell from which a DL assignment is received. If the carrier from which a PDSCH is to be received is not an extension carrier, the controller 3110 controls the transceiver 3105 to descramble the PDSCH using C-RNTI, PCI, and Ns for the cell from which the PDSCH is received.

The MUX/DEMUX unit 3120 multiplexes the data generated in the upper layer units 3125 and 3130 or the control message handler 3135, or demultiplexes the data received from the transceiver 3105 and delivers the demultiplexed data to the appropriate upper layer units 3125 and 3130 or the control message handler 3135.

The upper layer units 3125 and 3130, which may be made for associated services individually, process the data generated in user services such as FTP and VoIP, and deliver the processed data to a MUX unit, or process the data transferred by a DEMUX unit and deliver the processed data to an upper-layer service application.

Tenth Exemplary Embodiment

A tenth exemplary embodiment of the present invention provides a method and apparatus for deactivating an activated carrier.

An ENB aggregates a plurality of carriers for a UE in case of an increase in traffic for an arbitrary UE, and deactivates the aggregated carriers in case of a decrease in traffic, thereby minimizing power consumption by the UE. The carrier deactivation may be indicated using a deactivation signal. However, if a UE fails to receive the deactivation signal, the carrier to be deactivated may remain in the activated state, causing unnecessary power consumption. To solve these problems, the tenth exemplary embodiment of the present invention provides a method in which by introducing a deactivation timer, a UE deactivates a DL carrier by itself if a specific condition is met. If there is no data transmission/reception in an activated carrier for a predetermined time, a UE deactivates the carrier by itself To this end, the UE starts a deactivation timer if a DL carrier is activated, and restarts the timer upon receiving data from the DL carrier. If the timer expires, i.e., if DL data has not been received from the DL carrier for a specific period, the UE deactivates the DL carrier by itself Since not only DL data but also DL HARQ feedback are transmitted/received over a DL carrier, if there is a possibility that DL HARQ feedback will be received even though DL data is not received for a considerable period, the DL carrier should maintain its activated state. In the present invention, a UE restarts the deactivation timer every time it receives DL HARQ feedback, thereby preventing possible deactivation of a DL carrier expected to receive DL feedback. This situation in which DL feedback is continuously received may correspond to, for example, an case in which semi-persistent transmission resources are activated in a UL carrier associated with the DL carrier. In this case, in the UL carrier associated with the DL carrier, UL transmission is periodically performed, and a UE periodically receives DL HARQ feedback from the DL carrier.

Figure 32:
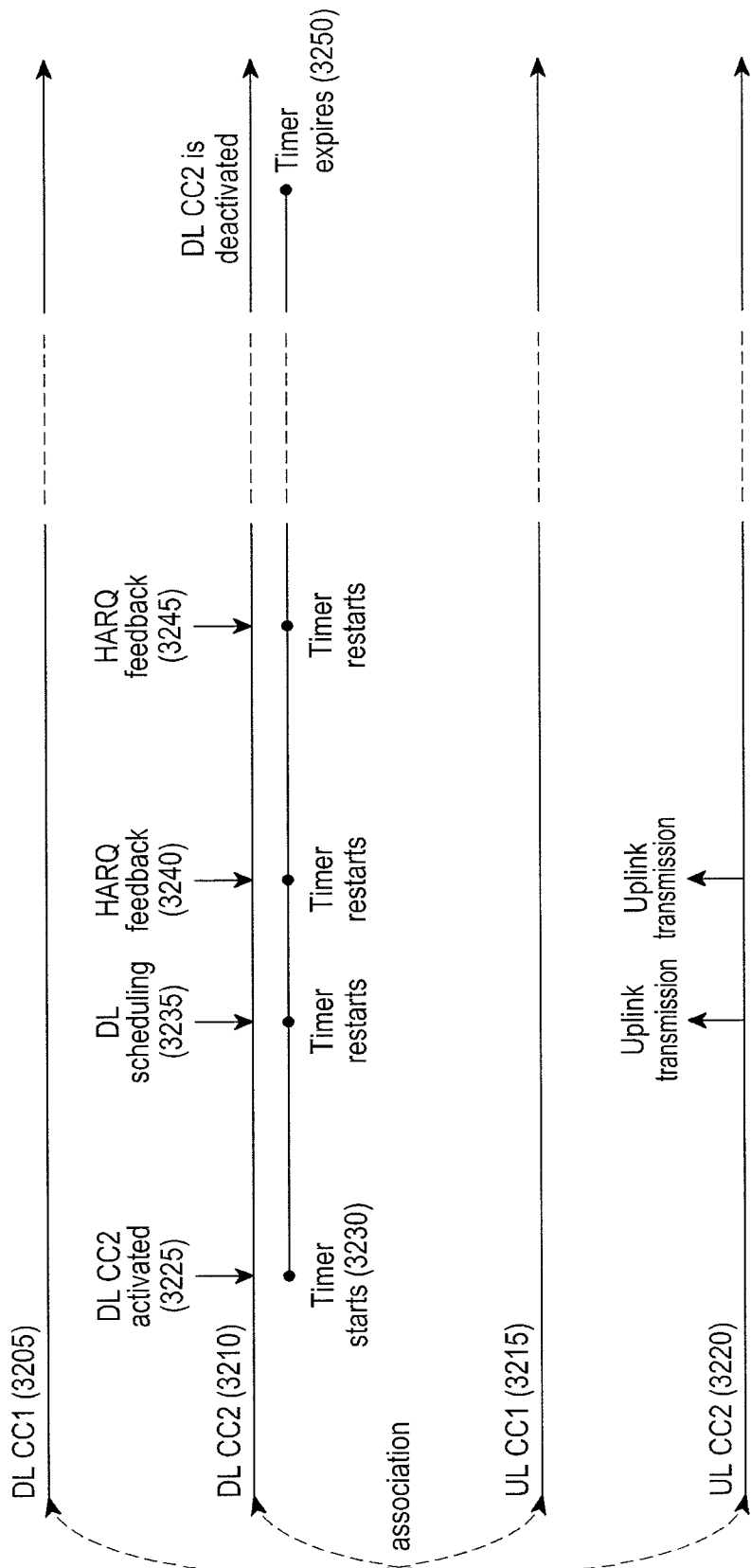
FIG. 32 is a diagram illustrating an example of an operation of deactivating activated carriers according to a tenth exemplary embodiment of the present invention.

FIG. 32 illustrates an example of an operation of deactivating activated carriers according to the tenth exemplary embodiment of the present invention.

Referring now to FIG. 32, if a DL CC 1 3205, a DL CC 2 3210, a UL CC 1 3215, and a UL CC 2 3220 are aggregated for an arbitrary UE, the DL CC1 and the UL CC1 are associated with each other, and the DL CC 2 and UL CC2 are associated with each other. If the DL CC 2 is activated at an arbitrary time 3225, a UE starts a deactivation timer for the carrier at time 3230. The timer is restarted every time data is received from the carrier, for example, time 3235, or every time DL HARQ feedback is received, for example, times 3240 and 3245. The DL HARQ feedback is transmitted/received when UL transmission has occurred in a UL carrier associated with the DL carrier, and the UL transmission may be, for example, UL transmission over semi-persistent transmission resources.

At an arbitrary time, if DL data or DL HARQ feedback is no longer received from the DL carrier until the deactivation timer expires at time 3250, the UE deactivates the DL carrier.

Figure 33:
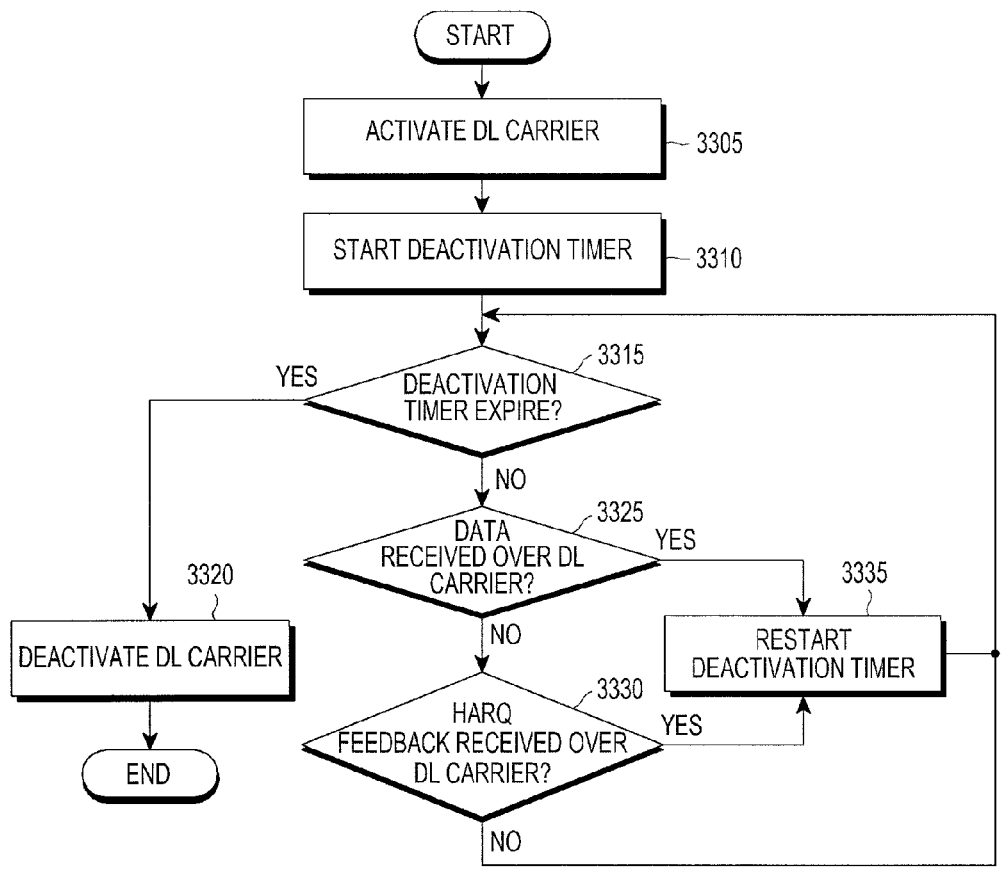
FIG. 33 is a flowchart illustrating an operation of a UE according to the tenth exemplary embodiment of the present invention.

FIG. 33 illustrates an operation of a UE according to the tenth exemplary embodiment of the present invention.

Referring now to FIG. 33, a UE activates an arbitrary DL carrier in step 3305, and starts a deactivation timer for the DL carrier in step 3310. After starting the deactivation timer, the UE checks in step 3315 whether the deactivation timer has expired, in every subframe. The UE proceeds to step 3325 if the deactivation timer has not expired, and to step 3320 if the deactivation timer has expired. In step 3320, the UE deactivates the DL carrier whose deactivation timer has expired, and then ends the process.

In step 3325, the UE checks if DL data has been received from the DL carrier in a pertinent subframe. The DL data's having been received may correspond to, for example, having received a PDSCH over the DL carrier. The DL data's having been received may correspond to having received a DL assignment indicating new DL data transmission over the DL carrier, or a DL assignment indicating DL data retransmission over the DL carrier. The UE proceeds to step 3335 if data has been received in step 3325, and to step 3330 if data has not been received. In step 3330, the UE checks if an HARQ feedback has been received from the DL carrier in the pertinent subframe. The UE proceeds to step 3335 upon receiving an HARQ feedback. If neither the HARQ feedback nor the DL data have been received in the subframe in step 3330, the UE returns to step 3315 and repeats the same check process in the next subframe. In step 3335, the UE restarts the deactivation timer. In other words, the UE initializes and restarts the timer. For example, if the timer has already run x msec, the UE sets a value of the timer to its initial value and restarts the timer. Thereafter, the UE proceeds to step 3315 and repeats the same check process in the next subframe.

Figure 34:
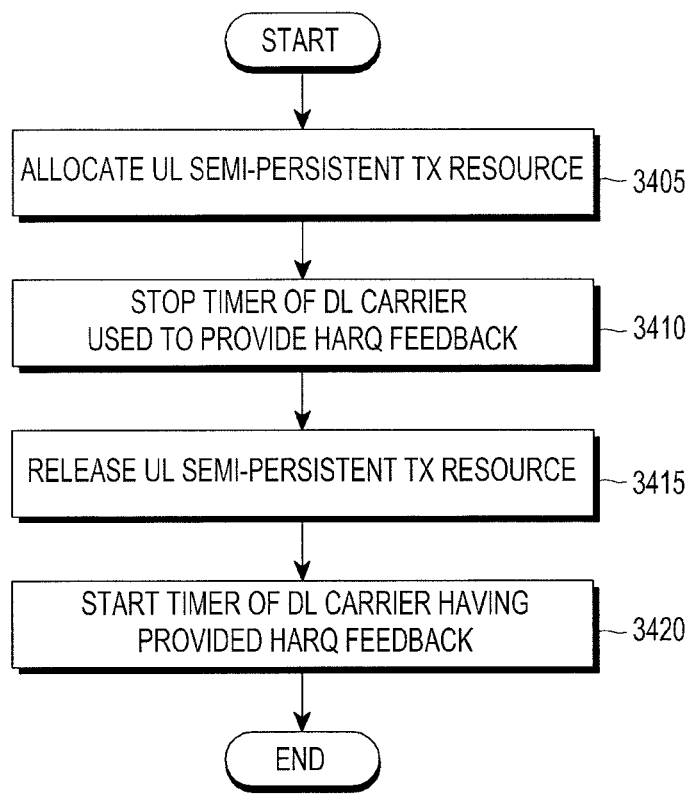
FIG. 34 is a flowchart illustrating another operation of a UE according to the tenth exemplary embodiment of the present invention.

FIG. 34 illustrates another operation of a UE according to the tenth exemplary embodiment of the present invention.

With reference to FIG. 34, a description will be made of a method for minimizing the number of deactivation timers running at the same time, by stopping a deactivation timer for the DL carrier where a DL HARQ feedback is provided for a UL carrier, to which semi-persistent transmission resources are allocated.

If semi-persistent transmission resources are allocated from an arbitrary UL carrier in step 3405, a UE proceeds to step 3410. The semi-persistent transmission resources' being activated (or allocated) means that semi-persistent transmission resources have been allocated to a UE over a DL PDCCH. The UE transmits UL data with the allocated semi-persistent transmission resources at a predetermined period. Semi-persistent transmission resources being allocated may be referred to as semi-persistent transmission resources' being activated.

In step 3410, the UE stops a deactivation timer for the DL carrier from which an HARQ feedback will be received for the UL data to be transmitted through the semi-persistent transmission resources, and then initializes a value of the timer. In other words, for the DL carrier, the UE is adapted not to perform its own deactivation caused by expiration of the deactivation timer. The DL carrier from which an HARQ feedback will be received for the UL data transmitted over semi-persistent transmission resources, may be determined in several different methods. For example, a DL carrier which is associated, in terms of scheduling, with the UL carrier to which semi-persistent transmission resources are to be allocated, may provide an HARQ feedback. A UL grant for an arbitrary UL carrier may be set to be provided only through a specific DL carrier, and in this case, it is expressed that the DL carrier is associated with the UL carrier in terms of scheduling. A UL carrier to which semi-persistent transmission resources are allocated, and a DL carrier to provide an HARQ feedback for the UL carrier may be preset in a call setup process. Also, it may be provided that an HARQ feedback for semi-persistent transmission resources may be transmitted over a DL carrier through which semi-persistent transmission resource allocation messages are exchanged.

Thereafter, the UE waits until the UL semi-persistent transmission resources are released. For reference, semi-persistent transmission resources being released may be referred to as semi-persistent transmission resources being deactivated. If the UL semi-persistent transmission resources are released in step 3415, the UE starts in step 3420 the deactivation timer which was stopped in step 3410, i.e., the deactivation timer for the DL carrier that provided the HARQ feedback for the released semi-persistent transmission resources. In other words, the UE resumes the operation of deactivating a related DL carrier by itself upon expiration of the deactivation timer.

Eleventh Exemplary Embodiment

Figure 35:
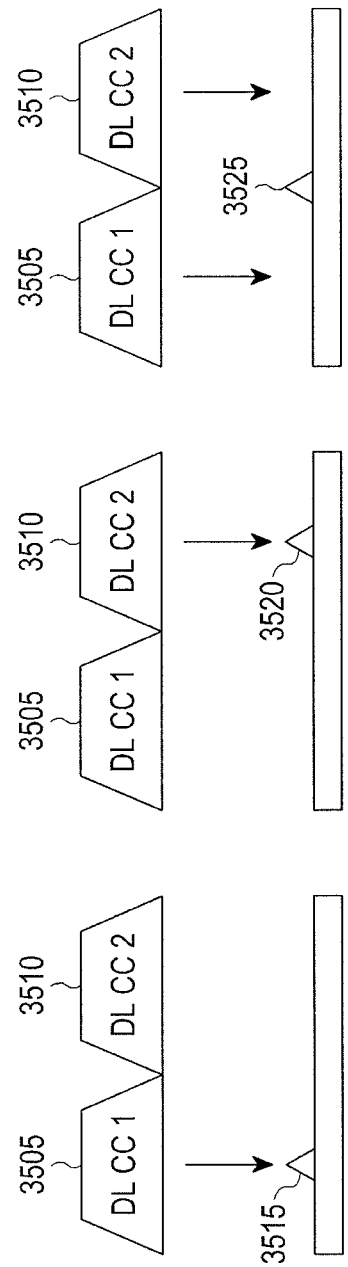
FIG. 35 is a diagram illustrating an example of Radio Frequency (RF) reconfiguration according to an exemplary embodiment of the present invention.

FIG. 35 illustrates an example of Radio Frequency (RF) reconfiguration according to an exemplary embodiment of the present invention.

Depending on the performance of a UE, RF should be reconfigured (or readjusted) occasionally when DL CC is activated or deactivated. For example, if a UE has only one RF and aggregates carriers only in the same frequency band, the UE may have to adjust (or configure) a center frequency of the RF according to the activation/deactivation of carriers. Referring now to FIG. 35, for example, if only a DL CC 1 3505 is in an activated state, the center frequency of the RF is matched to a center frequency 3515 of the DL CC1, whereas if only a DL CC 2 3510 is in an activated state, the center frequency of the RF is matched to a center frequency 3520 of the DL CC2. If both the DL CC1 and the DL CC2 are activated, the center frequency of the RF is matched to the center 3525 between the DL CC1 and the DL CC2. The operation of adjusting a center frequency of RF is needless when the UE has separate RFs for DL CCs individually. However, since a low-priced UE may have only one RF, it may require the above process of adjusting a center frequency of RF every time DL CC is activated or deactivated. For reconfiguration (or readjustment) of an RF center frequency, about hundreds of microseconds are required generally. Because data transmission/reception is impossible when a UE is reconfiguring an RF center frequency, data loss may occur if the UE undergoes scheduling while reconfiguring the RF center frequency.

The present exemplary embodiment provides a method and apparatus in which if an event occurs in which an RF center frequency should be changed, a UE reconfigures the RF center frequency in a subframe agreed upon in advance with an ENB, thereby preventing a data loss.

Figure 36:
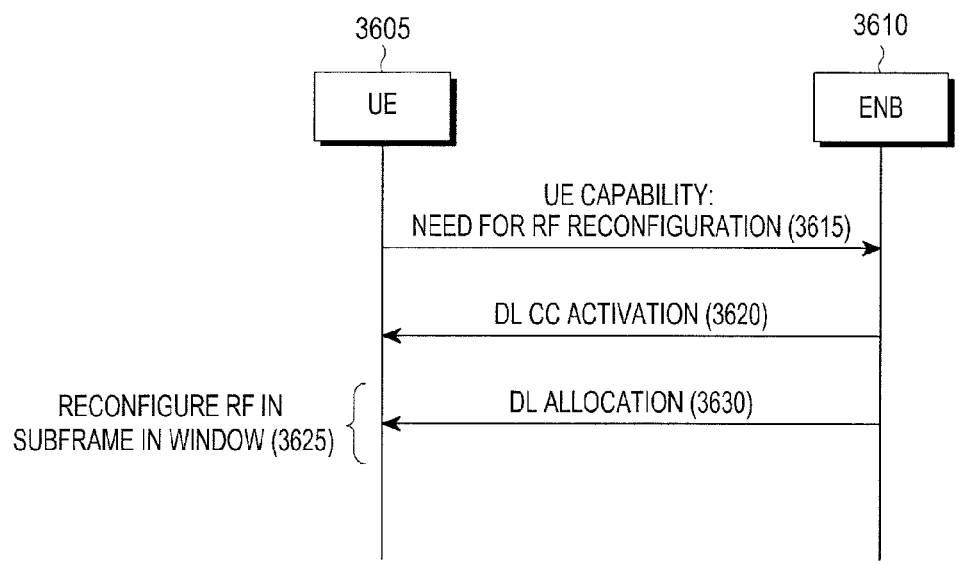
FIG. 36 is a flow diagram illustrating an example of an operation of reconfiguring RF according to an eleventh exemplary embodiment of the present invention.

FIG. 36 illustrates an example of an operation of reconfiguring RF according to the eleventh exemplary embodiment of the present invention.

Referring now to FIG. 36, in step 3615, while reporting its own performance to an ENB 3610 in an initial call setup process or a process of transitioning to an RRC connected state, a UE 3605 notifies an indicator indicating the necessity/non-necessity of RF reconfiguration, as well. If the UE 3605 has a CA capability, and should reconfigure RF when activating or deactivating a carrier due to the limit of RF, the UE 3605 sets the indicator as 'Yes' and reports it to the ENB 3610.

Thereafter, the ENB 3610 configures a plurality of carriers for the UE 3605 through a normal control procedure with the UE 3605. In step 3620, the ENB 3610 transmits control information commanding the UE 3605 to activate a carrier at the time it determines to be needed. The carrier activation command may be control information of a MAC layer. The carrier activation command may undergo HARQ retransmission because it is transmitted in a common MAC PDU. Upon successfully receiving the carrier activation command, the UE 3605 determines a subframe where RF reconfiguration is possible after a lapse of a predetermined period since the subframe where the command is received. For convenience of description, the period for which a UE is allowed to perform RF reconfiguration is called an RF reconfiguration window. In step 3625, the UE 3605 performs RF reconfiguration in a first subframe, where the ongoing data transmission/reception is affected despite execution of the RF reconfiguration, among the subframes in an RF reconfiguration window. A subframe where the ongoing data transmission/reception is affected despite execution of RF reconfiguration may include, for example, other DL subframes except for a 'subframe where an HARQ ACK/NACK is to be received', a 'subframe where semi-persistent transmission resources are allocated', and a 'subframe where an adaptive retransmission command for uncompleted UL transmission may be received'. That is, upon receiving a DL carrier activation command, a UE performs RF reconfiguration in a first subframe other than (i) a subframe where an HARQ ACK/NACK is to be received, (ii) a subframe where semi-persistent transmission resources are allocated, and (iii) a subframe where an adaptive retransmission command for uncompleted UL transmission may be received, among the subframes in an RF reconfiguration window or until another specific period elapses since a lapse of a specific period from the time the command was received. If such DL subframes do not exist in the RF reconfiguration window, the UE 3605 performs RF reconfiguration in the first subframe in the RF reconfiguration window.

In step 3630, in the other subframes except for the subframe where RF reconfiguration is performed, the ENB 3610 may allocate a DL assignment or transmit DL data to the UE 3605. In other words, even in the RF reconfiguration window, data transmission/reception is possible in the other subframes except for the subframe where the RF reconfiguration is performed.

Figure 37:
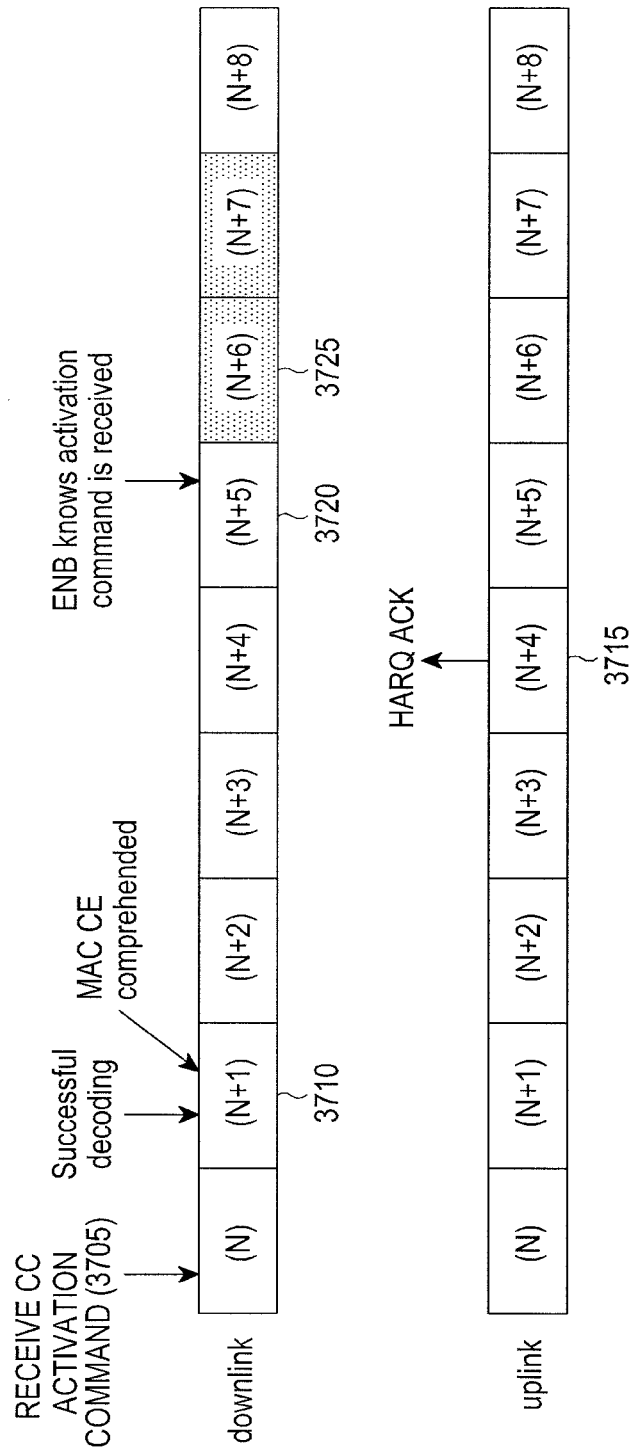
FIG. 37 is a diagram illustrating an example of an RF reconfiguration window according to an exemplary embodiment of the present invention.

FIG. 37 illustrates an example of an RF reconfiguration window according to an exemplary embodiment of the present invention.

An RF reconfiguration window will be described in more detail with reference to FIG. 37.

If a MAC PDU with a carrier activation command is received in an N-th subframe 3705, decoding of the MAC PDU is generally completed in an (N+1)th subframe 3710 and a command included in the MAC PDU is analyzed. According to the HARQ procedure of the LTE system, an HARQ feedback for the MAC PDU is transmitted in an (N+4)th UL subframe 3715. If the MAC PDU was successfully decoded, the feedback is an HARQ ACK, and because of a time difference between a DL subframe and a UL subframe, an ENB detects in an (N+5)th subframe 3720 the fact that the HARQ ACK was received, i.e., the fact that the DL carrier activation command was normally transmitted. Because the fact that a carrier activation signal transmitted in an N-th subframe was normally handled is detected by an ENB in an (N+5)th subframe, the ENB may perform a necessary operation from the next subframe, i.e., an (N+6)th subframe 3725. For these reasons, it is preferable for an RF reconfiguration window to start with a subframe after a lapse of five subframes from the subframe where the carrier activation command was received. As to a size (or a length) of the RF reconfiguration window, two to three subframes may be good enough.

In exemplary embodiments of the present invention, it is assumed that a start point and a size of the RF reconfiguration window are set for each UE individually by an ENB. However, fixed values may be used as the start point and the size of the RF reconfiguration window. For example, if a carrier activation command is received in an Nth subframe, an RF reconfiguration window may be set as (N+6)~(N+8). A size of the window may be unlimited.

Figure 38:
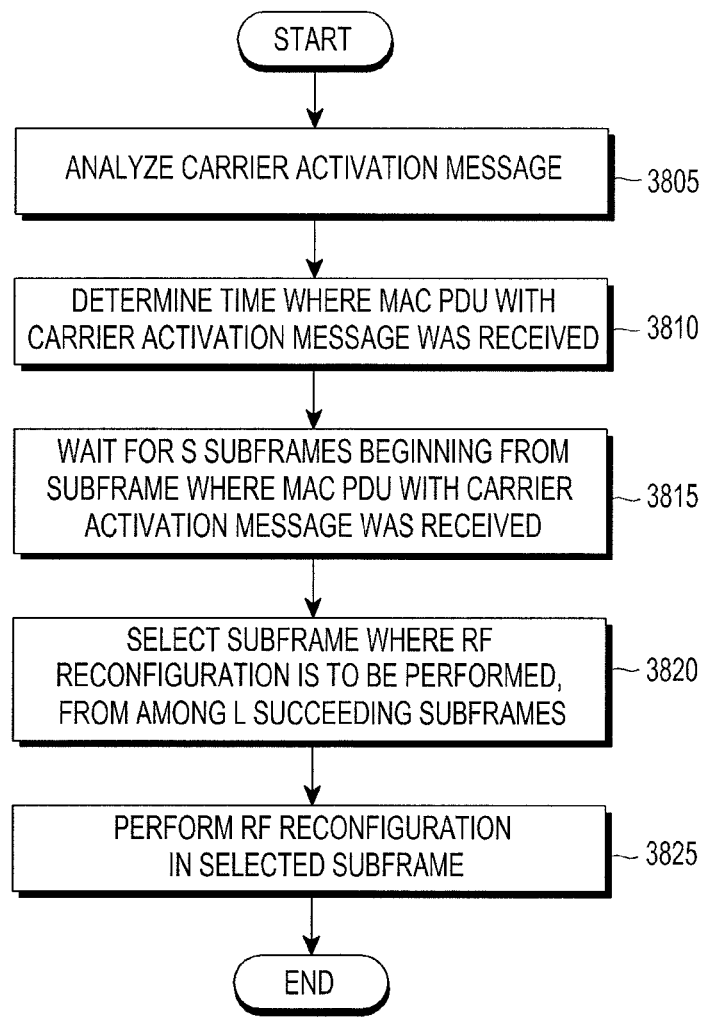
FIG. 38 is a flowchart illustrating an operation of a UE according to the eleventh exemplary embodiment of the present invention.

FIG. 38 illustrates an operation of a UE according to the eleventh exemplary embodiment of the present invention.

Referring now to FIG. 38, in step 3805, a UE detects the necessity of RF reconfiguration by analyzing a control message for activating a DL carrier. In step 3810, the UE determines a subframe where a MAC PDU with the control message was received. For example, upon detecting the fact in an (N+1)th subframe that an arbitrary MAC PDU includes a control message indicating DL carrier activation, the UE determines the last subframe where the MAC PDU was received. Once received, the MAC PDU is decoded after undergoing HARQ soft combining. In addition, a CRC operation is performed thereon to check the success/fail in reception, and in case of CRC OK, the UE demultiplexes the MAC PDU by analyzing a subheader of the MAC PDU. Whether a carrier activation message is included in an arbitrary MAC PDU may be determined in the demultiplexing process. While a time required until a UE performs a demultiplexing process for a MAC PDU after completing the MAC PDU reception may vary depending on the implemented performance of the UE, it is general that the required time is much shorter than 1 msec. Therefore, step 3810 may be implemented with a specific offset for implementation of the UE. If the fact that carrier activation information is stored in a MAC PDU was detected by a UE in, for example, an X-th subframe, the UE may determine that the MAC PDU was received in a (X−m)th subframe, where 'm' is a parameter dependent on UE implementation.

In step 3815, the UE waits until S subframes elapse since the subframe where the MAC PDU was received, i.e., since the Nth subframe in the example of FIG. 37. For example, the UE waits for the time at which an RF reconfiguration window starts. The parameter S indicating a start point of the RF reconfiguration window may be set for each UE individually, or may be defined as a predetermined specific value.

In step 3820, the UE determines a certain subframe in the RF reconfiguration window, in which it will perform RF reconfiguration. A size L of the RF reconfiguration window may be set for each UE individually, or may be defined as a predetermined specific value. In step 3825, the UE may perform RF reconfiguration in a first DL subframe that meets, for example, the following Condition 1 and falls within the RF reconfiguration window.

Condition 1: The subframe is not a subframe in which HARQ ACK/NACK reception is not scheduled and an adaptive retransmission command for uncompleted UL HARQ retransmission may be received, and is a subframe in which no semi-persistent transmission resources are configured.

For the UL data transmitted in an xth subframe, an HARQ ACK/NACK is received in an (x+4)th DL subframe. Therefore, if UL data transmission was performed between the time four subframes before a start of the RF reconfiguration window, and the subframe at which the RF reconfiguration window starts, then HARQ ACK/NACK reception for the UL data transmission falls within the RF reconfiguration window. The UE excludes the subframe where an HARQ ACK/NACK is to be received, from the subframes where RF reconfiguration is to be performed.

When a UL grant is received in a yth subframe, a UL grant indicating adaptive retransmission may be received in (y+8), (y+16), . . . , (y+max_retrans*8)th subframes. The UE excludes the subframe where the UL grant indicating adaptive retransmission may be received, from the subframes where RF reconfiguration is to be performed.

Semi-persistent transmission resources may be allocated in order to efficiently use a service in which data having a specific size is generated periodically, such as VoIP. The semi-persistent transmission resources are transmission resources which are automatically allocated in a specific subframe which comes at a specific period, and may be referred to as a configured DL assignment. Since DL data is transmitted in a DL subframe where a configured DL assignment is configured, if RF reconfiguration is performed in this DL subframe, a data loss may occur. So, the UE excludes the DL subframe where a DL assignment is configured, from the subframes where RF reconfiguration is to be performed.

If there is no subframe meeting Condition 1 among the subframes in the RF reconfiguration window, the UE selects the first subframe in the RF reconfiguration window as a subframe where RF reconfiguration is to be performed. If a size of the window is infinity, the UE waits for occurrence of a subframe meeting the above condition, and performs RF reconfiguration in the subframe meeting the above condition.

In step 3825, the UE reconfigures RF in the selected subframe.

If a UE should measure a frequency other than the current frequency, or a Radio Access Technology (RAT) other than the current RAT, an ENB may allocate a measurement gap to the UE. The measurement gap is set to occur once every 40 or 80 msec, and a length thereof is 6 msec. For a period of the measurement gap, the UE measures another frequency or another RAT, and stops DL data reception and UL data transmission. If the measurement gap exists at the time close to the time where a carrier activation command is received, it is preferable to reconfigure RF in the measurement-gap period.

Figure 39:
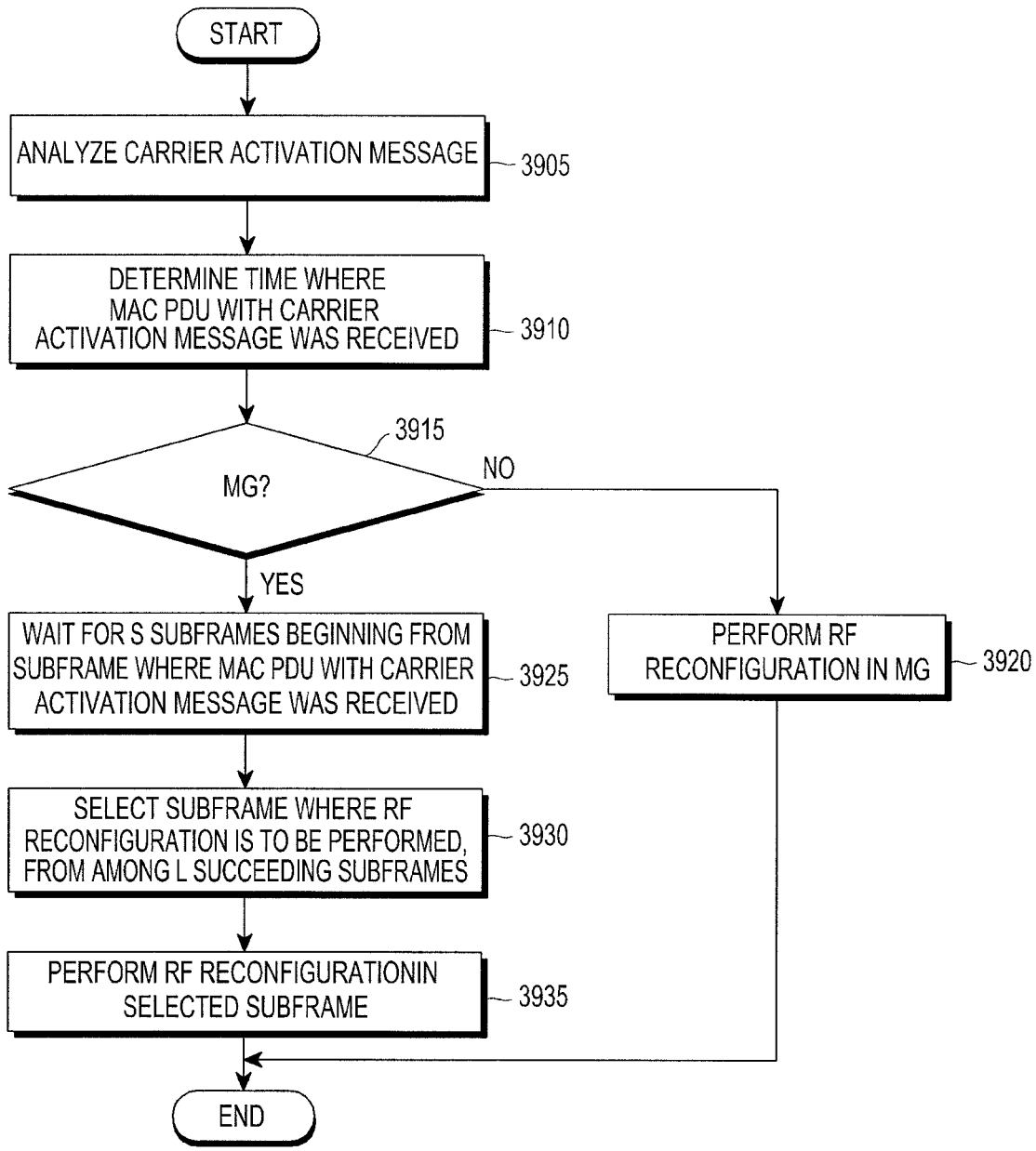
FIG. 39 is a flowchart illustrating another operation of a UE according to the eleventh exemplary embodiment of the present invention.

FIG. 39 illustrates another operation of a UE according to the eleventh exemplary embodiment of the present invention.

An operation of performing RF reconfiguration preferentially in a measurement-gap period will be described with reference to FIG. 39.

Referring now to FIG. 39, in step 3905, a UE detects the necessity of RF reconfiguration by analyzing a control message for activating a DL carrier. Thereafter, in step 3910, the UE checks a subframe in which a MAC PDU with the control message is received.

In step 3915, the UE determines whether it can perform RF reconfiguration using a Measurement Gap (MG). For example, if the following Condition 2 is met, the UE determines that it can perform RF reconfiguration using a measurement gap.

Condition 2: A measurement gap is set to occur in a specific period, and the specific period includes a period including subframes in which an RF reconfiguration window is ended in the subframe where a UE recognizes the necessity of RF reconfiguration.

In other words, upon recognizing the necessity of RF reconfiguration by receiving a carrier activation message, the UE determines whether a measurement gap will occur between the pertinent subframe and a subframe where the RF reconfiguration window is ended. If it is determined that the measurement gap will occur, the UE proceeds to step 3920, determining that the check result in step 3910 is 'True'. Otherwise, the UE proceeds to step 3925. In step 3920, the UE reconfigures RF in one of the subframes belonging to the measurement gap.

On the other hand, operations in step 3925 and its succeeding steps are the same as those of the UE operation illustrated in FIG. 38, so a detailed description thereof is omitted. Steps 3925, 3930 and 3935 are equal to steps 3815, 3820 and 3825, respectively.

In the UE operations illustrated in FIGS. 38 and 39, a time of 1 msec or less is assumed to be consumed for RF reconfiguration. While this assumption is valid in most cases, a reconfiguration delay longer than this may occur depending on UEs. In this case, the UE notifies an ENB of the RF reconfiguration delay in advance in a UE performance report message (see step 3615 in FIG. 36), and performs RF reconfiguration in specific consecutive subframes beginning from the subframe meeting Condition 1 or 2. If the time consumed for RF reconfiguration ranges from (y−1) msec to y msec, the UE selects y subframes beginning from the subframe meeting Condition 1 in step 3820 or 3930, instead of selecting one subframe. If there are no subframes meeting Condition 1, the UE selects y subframes beginning from the first subframe in the RF reconfiguration window. The other operations are equal to those in the case where the RF reconfiguration delay is 1 msec or less, so a description thereof is omitted.

Figure 40:
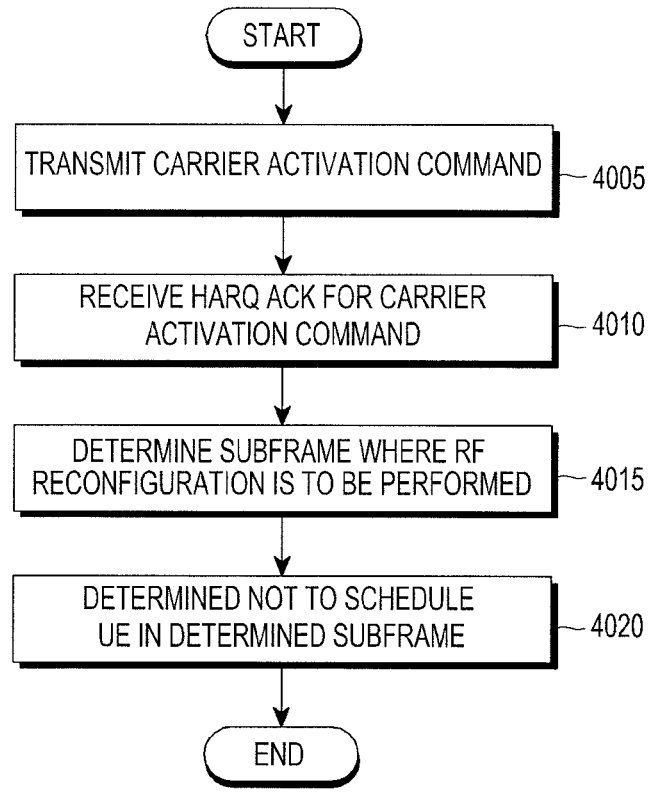
FIG. 40 is a flowchart illustrating an operation of an ENB according to the eleventh exemplary embodiment of the present invention.

FIG. 40 illustrates an operation of an ENB according to the eleventh exemplary embodiment of the present invention.

Referring now to FIG. 40, upon determining to activate a carrier, an ENB transmits a carrier activation command to a UE in step 4005. After transmitting a MAC PDU with the carrier activation command stored therein to the UE, upon receiving an HARQ ACK for the MAC PDU in step 4010, the ENB determines in step 4015 a subframe where the UE will reconfigure RF for the carrier activation. The ENB determines a subframe(s) meeting Condition 1 in the RF reconfiguration window, as an RF reconfiguration subframe. Also, the ENB determines, as an RF reconfiguration subframe, a subframe(s) that meets Condition 2 and exists between the last subframe where the MAC PDU was transmitted and the subframe where the RF reconfiguration window is ended. In step 4020, the ENB determines not to schedule the UE in the RF reconfiguration subframe.

While the tenth and eleventh exemplary embodiments of the present invention have been described in connection with the case where carriers are activated, these two exemplary embodiments may also be applied to many other cases where RF reconfiguration is needed, for example, the case where carriers are deactivated. In particular, given that RF reconfiguration for carrier activation should be performed as rapidly as possible but RF reconfiguration for carrier deactivation may put up with some delays, during carrier activation, an ENB may allow a UE to reconfigure RF in a predetermined subframe, for example, in a subframe a specific interval after the time the MAC PDU indicating carrier activation was received (i.e., the window is not used), and during carrier deactivation, the ENB may allow the UE to reconfigure RF in a first subframe meeting Condition 1 or 2 beginning from a subframe a specific interval after the time the MAC PDU indicating carrier deactivation was received (i.e., an window with an infinite size is used).

Figure 41:
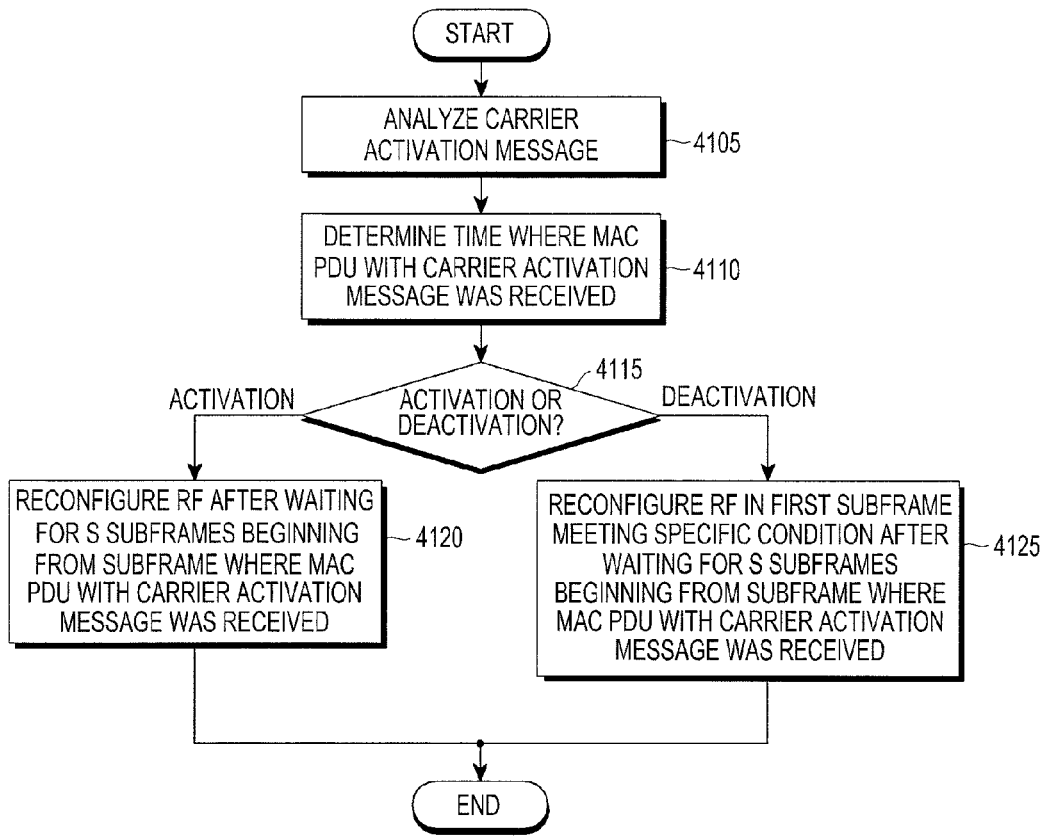
FIG. 41 is a flowchart illustrating a UE operation of selecting a subframe in which RF is to be reconfigured during carrier activation and deactivation according to an exemplary embodiment of the present invention.

FIG. 41 illustrates a UE operation of selecting a subframe in which RF is to be reconfigured during carrier activation and deactivation according to an exemplary embodiment of the present invention.

Referring now to FIG. 41, in step 4105, a UE recognizes the necessity of RF reconfiguration by analyzing a control message for activating a DL carrier. Thereafter, in step 4110, the UE determines a subframe where a MAC PDU with the control message was received. Step 4110 is the same as step 3810, so a detailed description thereof is omitted. In step 4115, the UE determines whether the control message indicates activation or deactivation of an arbitrary carrier. Since the control message contains bitmap information indicating states of carriers configured for a UE, one control message may activate or deactivate a plurality of carriers. If the control message indicates activation of an arbitrary carrier, the UE proceeds to step 4120, and if the control message indicates deactivation of an arbitrary carrier, the UE proceeds to step 4125. If the control message indicates both activation and deactivation, for example, if the control message indicates activation for a carrier 1, and deactivation for a carrier 2, the UE proceeds to step 4120.

In step 4120, the UE reconfigures RF after waiting for a specific number S of subframes beginning from the subframe where the MAC PDU with the control message indicating the activation of a carrier was received. The parameter S may be set for each UE individually, or may be defined as a predetermined specific value.

In step 4125, the UE reconfigures RF in a subframe meeting a specific condition, after waiting for a specific number S of subframes beginning from the subframe where the MAC PDU with the control message indicating the deactivation of a carrier was received. The specific condition is to minimize the impact on the ongoing operation, and for example, it is possible to define a first subframe meeting Condition 1 as the subframe meeting a specific condition. Also, if measurement gaps are set, subframes belonging to the nearest measurement gap may be the subframes meeting a specific condition.

Figure 42:
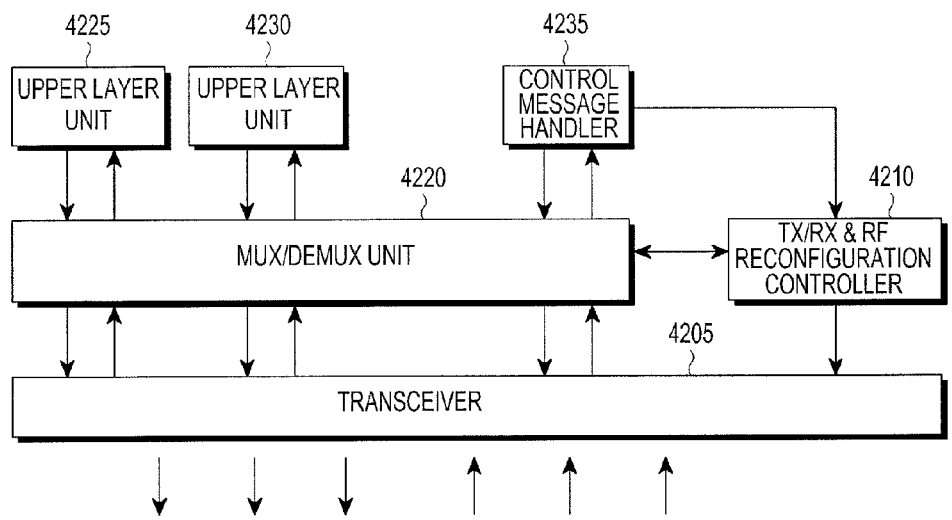
FIG. 42 is a diagram illustrating a UE according to the eleventh exemplary embodiment of the present invention.

FIG. 42 illustrates a UE according to the eleventh exemplary embodiment of the present invention.

Referring now to FIG. 42, the UE includes a transceiver 4205, a transmission/reception and RF reconfiguration (Tx/Rx & RF Reconfiguration) controller 4210, a MUX/DEMUX unit 4220, a control message handler 4235, and various upper layer units 4225 and 4230.

The transceiver 4205 receives data and a specific control signal over a DL carrier, and transmits data and a specific control signal over a UL carrier. When a plurality of carriers are aggregated, the transceiver 4205 transmits/receives data and control signals over the plurality of carriers. The transceiver 4205 includes various units including an RF unit.

The transmission/reception and RF reconfiguration controller 4210 controls the transceiver 4205 to transmit UL data and receive DL data according to a control signal, for example, a scheduling command, provided by the transceiver 4205. Upon receiving a carrier activation command from the MUX/DEMUX unit 4220, the transmission/reception and RF reconfiguration controller 4210 determines a subframe where it will reconfigure RF, and controls the transceiver 4205 to reconfigure RF in the determined subframe.

The MUX/DEMUX unit 4220 multiplexes the data generated in the upper layer units 4225 and 4230 or the control message handler 4235, or demultiplexes the data received from the transceiver 4205 and delivers the demultiplexed data to the appropriate upper layer units 4225 and 4230 or the control message handler 4235.

The control message handler 4235 handles a control message transmitted by the network and performs a required operation. The upper layer units 4225 and 4230, which may be constructed for associated services independently, process the data generated in user services such as a FTP and a VoIP and deliver the processed data to a MUX unit, or process the data transferred by a DEMUX unit and deliver the processed data to an upper-layer service application.

Figure 43:
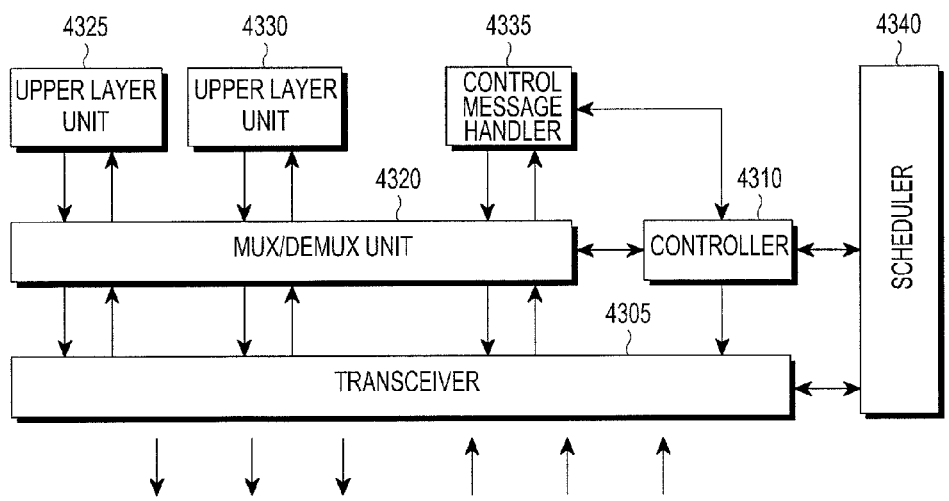
FIG. 43 is a diagram illustrating an ENB according to the eleventh exemplary embodiment of the present invention.

FIG. 43 illustrates an ENB according to the eleventh exemplary embodiment of the present invention.

Referring now to FIG. 43, an ENB includes a transceiver 4305, a controller 4310, a MUX/DEMUX unit 4320, a control message handler 4335, various upper layer units 4325 and 4330, and a scheduler 4340.

The transceiver 4305 receives data and a specific control signal over a UL carrier, and transmits data and a specific control signal over a DL carrier. When a plurality of carriers are aggregated, the transceiver 4305 transmits/receives data and control signals over the plurality of carriers.

The MUX/DEMUX unit 4320 multiplexes the data generated in the upper layer units 4325 and 4330 or the control message handler 4335, or demultiplexes the data received from the transceiver 4305, and delivers the multiplexed/demultiplexed data to the appropriate upper layer units 4325 and 4330 or the control message handler 4335. The MUX/DEMUX unit 4320 also multiplexes the control message, for example, a carrier activation message, transferred by the controller 4310, and transmits the multiplexed message to a UE. The control message handler 4335 generates a specific control message and delivers the generated message to the MUX/DEMUX unit 4320, or handles a control message provided by the MUX/DEMUX unit 4320. The upper layer units 4325 and 4330, which may be constructed for associated UEs or services independently, process the data generated in user services such as a FTP and a VoIP and deliver the processed data to a MUX unit, or process the data transferred by a DEMUX unit and deliver the processed data to an upper-layer service application.

Upon receiving an HARQ ACK for a carrier activation message, the controller 4310 determines a subframe where RF reconfiguration is to be performed, and delivers information on the subframe to the scheduler 4340.

The scheduler 4340 performs a scheduling operation so as not to schedule the UE in the RF reconfiguration subframe.

As is apparent from the foregoing description, the present exemplary embodiments can ensure rapid carrier activation, and minimize the inefficiency caused by transmitting a carrier activation command with a DL assignment.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for measuring a deactivated cell by a terminal in a mobile communication system, the method comprising:
    receiving measurement information for a deactivated cell, from a base station;
    in performing measurement on an activated cell in an activated state, determining a measurement interval and a measurement period taking a Discontinuous Reception (DRX) operation into account and measuring the activated cell at the determined measurement interval for the determined measurement period; and
    in performing measurement on the deactivated cell, determining a measurement interval and a measurement period using the received measurement information related to at least one of a measurement interval and a measurement period indicated by the base station, and measuring the deactivated cell at the determined measurement interval for the determined measurement period,
    wherein the measurement period is acquired by the equation:

$$\text{measurement period} = 5 * \text{measurement interval}.$$

2. The method of claim 1, wherein the determining of the measurement interval and the measurement period for the deactivated cell comprises acquiring the measurement period using the received measurement information related to the measurement interval.

3. A terminal in a mobile communication system, the terminal comprising:
- a receiver for receiving measurement information for a deactivated cell from a base station; and
- a controller for,
  - in performing measurement on an activated cell in an activated state, determining a measurement interval and a measurement period taking a Discontinuous Reception (DRX) operation into account and measuring the activated cell at the determined measurement interval for the determined measurement period; and
  - in performing measurement on the deactivated cell, determining a measurement interval and a measurement period using the received measurement information related to at least one of a measurement interval and a measurement period indicated by the base station, and measuring the deactivated cell at the determined measurement interval for the determined measurement period,
- wherein the measurement period is acquired by the equation:

measurement period=5*measurement interval.

4. The terminal of claim 3, wherein in the determining of the measurement interval and the measurement period for the deactivated cell, the controller acquires the measurement period using the received measurement information related to the measurement interval.

5. A method for measuring a deactivated cell by terminal in a mobile communication system, the method comprising:
- receiving measurement information for the deactivated cell from a base station;
- acquiring a measurement period using the received measurement information including a measurement interval; and
- measuring the deactivated cell using the measurement interval,
- wherein the measurement period is acquired by the equation:

measurement period=5*measurement interval.

6. The method of claim 5, wherein the measuring step comprises measuring the deactivated cell at the measurement interval for the measurement period.

7. A terminal for measuring a deactivated cell in a mobile communication system, the terminal comprising:
- a receiver for receiving measurement information for the deactivated cell from a base station; and
- a controller for acquiring a measurement period using the received measurement information including a measurement interval, and measuring the deactivated cell using the measurement interval,
- wherein the measurement period is acquired by the equation:

measurement period=5*measurement interval.

8. The terminal of claim 7, wherein the controller measures the cell in the deactivated state at the measurement interval for the measurement period.

9. A method for controlling a measurement of a deactivated cell by a base station in a mobile communication system, the method comprising:
- transmitting measurement information for the deactivated cell, the measurement information including a measurement interval,
- wherein the measurement period is acquired using the measurement interval by a terminal which has received the measurement information,
- wherein the deactivated cell is measured using the measurement interval by the terminal, and
- wherein the measurement period is acquired by the equation:

measurement period=5*measurement interval.

10. A base station in a mobile communication system, the base station comprising:
- a transceiver for transmitting/receiving data over a wireless network; and
- a controller for controlling an operation of transmitting measurement information for a deactivated cell, the measurement information including a measurement interval,
- wherein the measurement period is acquired using the measurement interval by a terminal,
- wherein the deactivated cell is measured using the measurement interval and by the terminal, and
- wherein the measurement period is acquired by the equation:

measurement period=5*measurement interval.

* * * * *